(12) United States Patent
Tagami et al.

(10) Patent No.: US 7,717,126 B2
(45) Date of Patent: May 18, 2010

(54) FLOAT VALVE STRUCTURE

(75) Inventors: Hiroya Tagami, Koga (JP); Jun Makita, Koga (JP); Hiroshi Oosaki, Koga (JP)

(73) Assignee: Kyosan Denki Co., Ltd., Koga (JP)

( * ) Notice: Subject to any disclaimer, the term of this patent is extended or adjusted under 35 U.S.C. 154(b) by 157 days.

(21) Appl. No.: 11/439,231

(22) Filed: May 24, 2006

(65) Prior Publication Data
US 2007/0006919 A1 Jan. 11, 2007

(30) Foreign Application Priority Data

Jul. 8, 2005 (JP) ............................. 2005-199517
Nov. 1, 2005 (JP) ............................. 2005-317874

(51) Int. Cl.
*B60K 15/035* (2006.01)

(52) U.S. Cl. ........................................ 137/43; 137/202

(58) Field of Classification Search ................ 137/202, 137/43, 39, 587
See application file for complete search history.

(56) References Cited

U.S. PATENT DOCUMENTS

| | | | | | |
|---|---|---|---|---|---|
| 4,753,262 | A | * | 6/1988 | Bergsma | 137/39 |
| 5,082,016 | A | * | 1/1992 | Nakamura | 137/202 |
| 5,172,714 | A | * | 12/1992 | Kobayashi et al. | 137/39 |
| 5,313,977 | A | * | 5/1994 | Bergsma et al. | 137/43 |
| 5,388,338 | A | * | 2/1995 | Majors | 33/376 |
| 5,402,818 | A | * | 4/1995 | Kasugai et al. | 137/198 |
| 5,439,023 | A | * | 8/1995 | Horikawa | 137/202 |
| 5,579,802 | A | * | 12/1996 | Tuckey | 137/202 |
| 5,738,132 | A | | 4/1998 | Zakai et al. | |
| 5,971,203 | A | * | 10/1999 | Bae | 220/746 |
| 5,992,441 | A | * | 11/1999 | Enge et al. | 137/202 |
| 6,058,963 | A | * | 5/2000 | Enge et al. | 137/202 |
| 6,158,456 | A | * | 12/2000 | Enge | 137/202 |
| 6,564,821 | B1 | * | 5/2003 | Orenstein et al. | 137/202 |
| 6,634,341 | B2 | * | 10/2003 | Crary et al. | 123/516 |
| 6,994,103 | B2 | * | 2/2006 | Takahashi et al. | 137/202 |
| 2002/0040730 | A1 | * | 4/2002 | Muto et al. | 137/202 |
| 2002/0157706 | A1 | | 10/2002 | Bergsma | |
| 2004/0221890 | A1 | * | 11/2004 | Takahashi et al. | 137/202 |
| 2005/0133089 | A1 | * | 6/2005 | Takahashi et al. | 137/202 |

FOREIGN PATENT DOCUMENTS

| | | |
|---|---|---|
| JP | A 2001-254650 | 9/2001 |
| JP | A 2004-257264 | 9/2004 |

\* cited by examiner

*Primary Examiner*—Stephen Hepperle
*Assistant Examiner*—Craig Price
(74) *Attorney, Agent, or Firm*—Oliff & Berridge, PLC

(57) ABSTRACT

A float valve structure that includes a case; a valve seat that is formed at an end portion of the case, at a position near an upper opening of the case; a float that is arranged in a space formed in the case so as to be vertically movable; a valve support member that is arranged above the float and that can be inserted into the upper opening; a valve that is fitted to the valve support member and that can contact the valve seat; and a valve opening member that can vertically move together with the float and that opens at least one portion of the valve.

18 Claims, 28 Drawing Sheets

FLOAT VALVE STRUCTURE

INCORPORATION BY REFERENCE

The disclosure of Japanese Patent Applications No. 2005-199517 filed on Jul. 8, 2005 and No. 2005-317874 filed on Nov. 1, 2005 including the specification, drawings and abstract are incorporated herein by reference in their entireties.

BACKGROUND OF THE INVENTION

1. Field of the Invention

The invention generally relates to a float valve structure. The invention relates, for example, to a float valve structure in which fuel evaporative gas in a fuel tank of, for example, a motor vehicle flows to a canister and is then absorbed in an absorbent in the canister, or the fuel in the fuel tank is prevented from flowing to the canister when a fuel level rises.

2. Description of the Related Art

A motor vehicle or the like includes a fuel tank that stores fuel to be supplied to a combustion chamber of an engine. The fuel tank is provided with a ventilation system to permit air to appropriately flow in/out of the fuel tank in accordance with decreases/increases in the amount of fuel in the fuel tank. The ventilation system provides communication between the inside of the fuel tank and a canister. If the fuel tank is supplied with a greater amount of fuel than the tank capacity, the fuel that spilt out of the fuel tank is discharged to the canister. If the fuel that spilt out of the fuel tank is discharged to the canister, the canister becomes wet and unusable. To avoid such a problem, a full-tank control valve is provided at the upper portion of the fuel tank. When the fuel tank is filled up with fuel, the full-tank control valve blocks the ventilation system, thereby preventing the air and fuel from being discharged to the canister.

In addition to the full-tank control valve, the fuel tank is provided with a fuel-leak prevention valve that always contacts the atmosphere and suppresses pressure fluctuations in the fuel tank. The fuel-leak prevention valve is closed when the motor vehicle is tilted or overturned.

Generally, the full-tank control valve and the fuel-leak prevention valve are individually provided. However, a float valve serving as both the full-tank control valve and the fuel-leak prevention valve has already been proposed in order, for example, to reduce the cost.

Such a float valve is shown in FIG. 29. In a float valve 1, a valve support member 4 with a cylindrical body portion 4a and a float 5 are housed in an internal space 3 defined by a case 2. An upper opening 8a is formed in the upper portion of the float valve 1, and a lower opening 8b is formed in the lower portion of the float valve 1. The case 2 is housed in a fuel tank 6. The case 2 is arranged such that a flange 7, which is horizontally formed around the upper portion of the outer wall of the case 2, is fitted to the top wall surface of the fuel tank 6.

The float 5 moves upward when the fuel in the fuel tank 6 flows into the internal space 3 through the lower opening 8b. A rod-like first valve 9 having a small diameter is formed on the top surface of the float 5. A second valve 4b having a large diameter is fitted to the upper portion of the valve support member 4. The valve support member 4 is arranged above the float 5 so as to be vertically movable.

An upper-end opening 12 having a small diameter is formed in the center portion of the valve support member 4. A first valve seat 10 is formed in the inner surface of the center portion of the valve support member 4, at the position near the lower-end of the upper-end opening 12. The first valve 9 of the float 5 can contact the first valve seat 10.

A second valve seat 11 is formed at the end portion of the case 2, at the position near the lower-end of the upper opening 8a of the case 2. The float 5 and the valve support member 4 move upward together with each other, when fuel flows into the internal space 3 through the lower opening 8b, for example, when the fuel is supplied into the fuel tank 6. The first valve 9 of the float 5 contacts the first valve seat 10 of the valve support member 4, thereby blocking the upper-end opening 12. The second valve 4b contacts the second valve seat 11 formed at the position near the lower-end of the upper opening 8a, thereby blocking the upper opening 8a. Thus, the fuel is prevented from flowing to a canister (not shown) through a communication passage 13 formed above the upper opening 8a.

When the valve is closed, the force with which the first valve 9 contacts the first valve seat 10 is considerably less than the force with which the second valve 4b contacts the second valve seat 11. Accordingly, if the pressure in the fuel tank 6 is reduced even by only a small amount, the float 5 moves downward due to its own weight. As a result, the first valve 9 moves away from the first valve seat 10, whereby communication is provided between the inside of the fuel tank 6 and the atmosphere through the upper-end opening 12.

As a result, the pressure in the fuel tank 6 is reduced, the second valve 4b immediately moves away from the second valve seat 11, and the upper opening 8a contacts the atmosphere. Accordingly, the pressure in the fuel tank 6 is reduced rapidly to the atmospheric pressure.

As described above, because the conventional float valve serves as both the full-tank control valve and the fuel-leak prevention valve, only one valve is required. Accordingly, the conventional float valve offers high cost performance and convenience, as described in Japanese Patent Application Publication No. JP-A-2004-257264.

Generally, a resin seal structure needs to offer high sealing performance. In addition, the production cost increases with increases in the number of portions where sealing needs to be provided. Therefore, the conventional float valve has a double seal structure in which two valve support members are used, as described above. In addition, in this seal structure, resin is used to form the first valve 9 and the first valve seat 10.

Accordingly, the float valve according to the related art can offer only limited sealing performance. Also, the double seal structure increases the production cost.

In order to address such problems, the seal structure including the first valve 9 having a small diameter and the first valve seat 10 may be omitted. However, such a structure causes another problem that the ease in re-opening the valve is reduced, for example, a greater force is required to cause the second valve 4b to move away from the second valve seat 11.

SUMMARY OF THE INVENTION

A float valve structure according to a first aspect of the invention includes a case; a valve seat that is formed at an end portion of the case, at a position near an upper opening of the case; a float that is arranged in a space formed in the case so as to be vertically movable; a valve support member that is arranged above the float and that can be inserted into the upper opening; a valve that is fitted to the valve support member and that can contact the valve seat; and a valve opening member that can vertically move together with the float and that opens at least one portion of the valve.

With this structure, if the fuel level in the fuel tank is lowered even by only a small amount after the valve is closed, the float moves downward and the valve opening member, which moves downward together with the float, forcibly presses at least one portion of the valve downward, whereby a part of the valve is forcibly opened. As a result, the valve is fully opened with reliability. The valve support member is formed in an appropriate size such that the valve support member can be inserted into the upper opening. Accordingly, when the valve support member moves upward, the valve support member enters the upper opening. As a result, when the valve is closed, the valve fitted on the periphery of the valve support member is elastically deformed while contacting the valve seat. The force with which the valve is closed increases, and the valve closing performance improves.

In addition, with this structure, when the valve is opened, at least one portion of the valve is forcibly opened by the valve opening member. Accordingly, when the fuel level in the fuel tank is lowered even by only a small amount after the valve is opened, the float moves downward due to its own weight, and the valve opening member, which moves downward together with the float, strongly presses the at least one portion of the valve. Therefore, even if the pressure in the fuel tank is high, the valve can be opened easily. Also, sealing is provided at only one portion, and this seal portion may be made of, for example, rubber instead of resin. This enhances the sealing performance and reduces the production cost. In addition, because the valve support member is formed in the appropriate size such that the valve support member can be inserted in the upper opening, the valve is elastically deformed while contacting the valve seat when the valve is closed. Accordingly, sealing can be provided uniformly to the seal portion, and the valve closing performance improves.

A float valve structure according to a second aspect of the invention includes a case; a valve seat that is formed at an end portion of the case, at a position near an upper opening of the case; a float that is arranged in a space formed in the case so as to be vertically movable; a valve support member that is arranged above the float; a valve that is fitted to the valve support member and that can contact the valve seat; a valve opening member that can vertically move together with the float and that opens at least one portion of the valve; and a wall body that is arranged on a top surface of the float at least at a position below the valve opening member.

With this structure, if the fuel level in the fuel tank is lowered even by only a small amount after the valve is closed, the float moves downward and the pressing portion of the valve opening member, which moves downward together with the float, forcibly presses at least one portion of the valve. Then, the at least one portion of the valve, which is pressed by the pressing portion, is forcibly opened. As a result, the valve is fully opened. The relatively thin valve is used for reduction in weight, etc. However, such a thin valve has the following problem. If the valve having an inappropriate thickness is used, the portion, which is pressed by the valve opening member when the valve is opened, is bent downward, and the valve contacts the valve seat with the portion bent downward when the valve is closed next time. Alternatively, if load is repeatedly applied to a portion of the valve by the valve opening member each time the valve is opened, the restoring force of the portion that receives the load is reduced, and the valve contacts the valve seat with the portion bent downward. If such a problem occurs, sealing cannot be provided uniformly, and the sealing performance is reduced. However, the wall body, which extends to the position near the bottom portion of the valve, is provided on the top surface of the float, at a position below the valve opening member, and the valve is supported on the top surface of the wall body. As a result, the valve is no longer bent.

In addition, with this structure, when the valve is opened, at least one portion of the valve is forcibly opened by the valve opening member. Accordingly, when the fuel level in the fuel tank is lowered even by only a small amount after the valve is opened, the float moves downward due to its own weight, and the valve opening member, which moves downward together with the float, strongly presses the at least one portion of the valve. Therefore, even if the pressure in the fuel tank is high, the valve can be opened easily. Also, sealing is provided at only one portion, and the seal portion may be made of, for example, rubber instead of resin. This enhances sealing performance and reduces the production cost. In addition, the wall body, which extends to the position near the bottom portion of the valve, is arranged on the top surface of the float at least at a position below the valve opening member. Accordingly, even if a part of the valve is bent downward due to repeatedly applied load, the bent portion is reliably supported on the top surface of the wall body. As a result, reduction in the valve closing performance can be reliably avoided.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals wherein.

DETAILED DESCRIPTION OF THE EXAMPLE EMBODIMENTS

In the following description, the invention will be described in more detail in terms of example embodiments.

A first embodiment of the invention will be described with reference to FIGS. 1 to 20.

Figure 1:
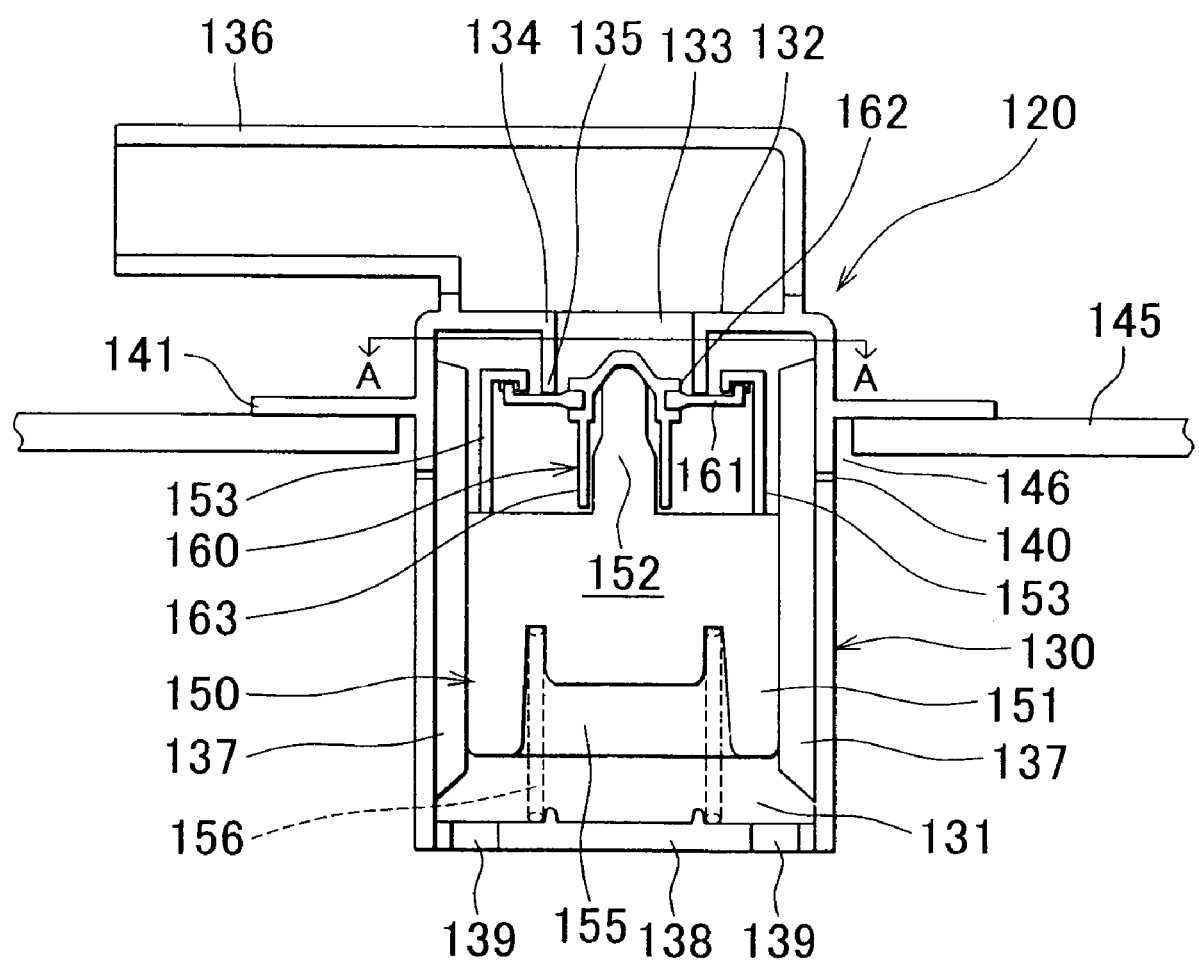
FIG. 1 illustrates the cross-sectional view of the entirety of a float valve according to a first embodiment of the invention, when a valve is closed.
Figure 2:
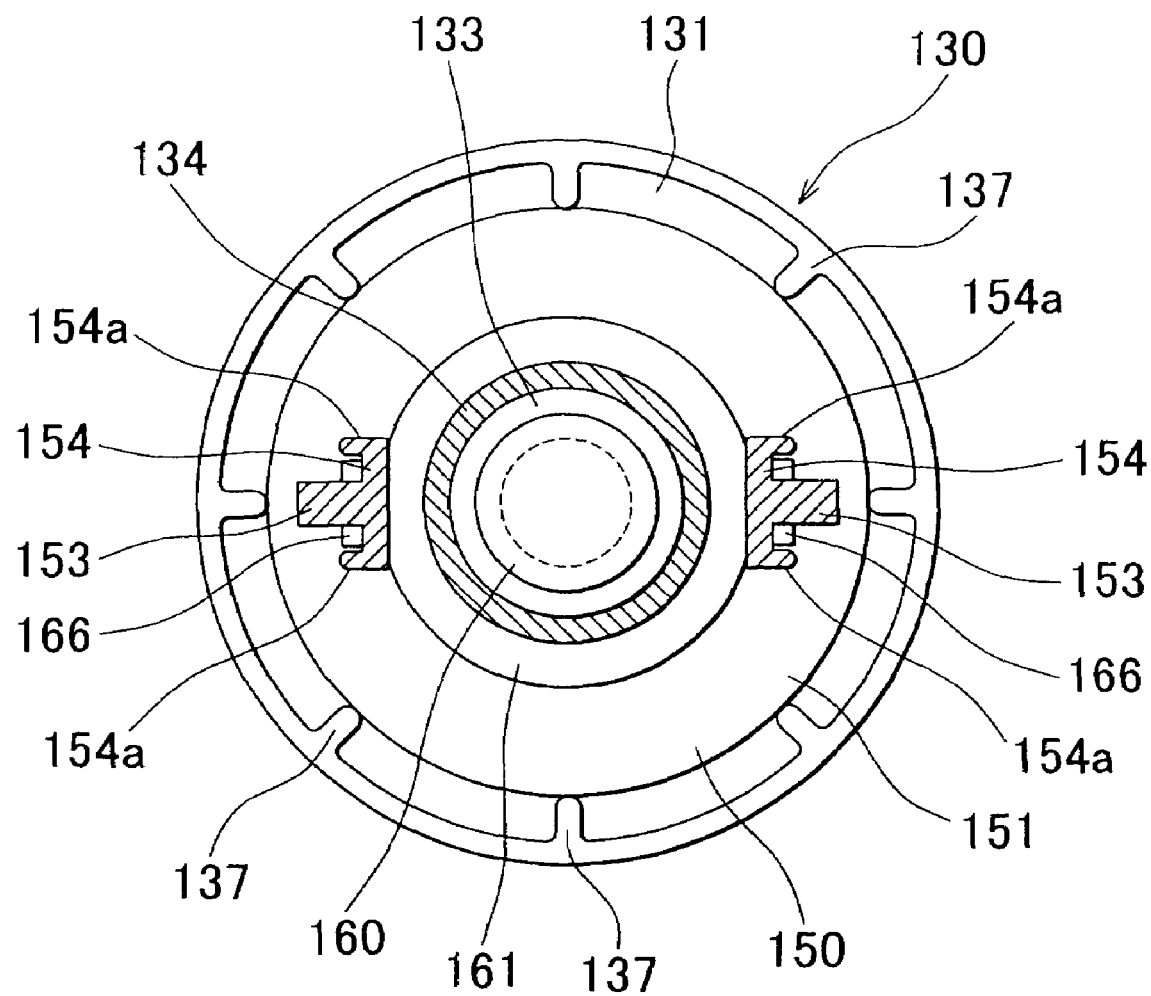
FIG. 2 illustrates the cross-sectional view taken along line A-A in FIG. 1.
Figure 3:
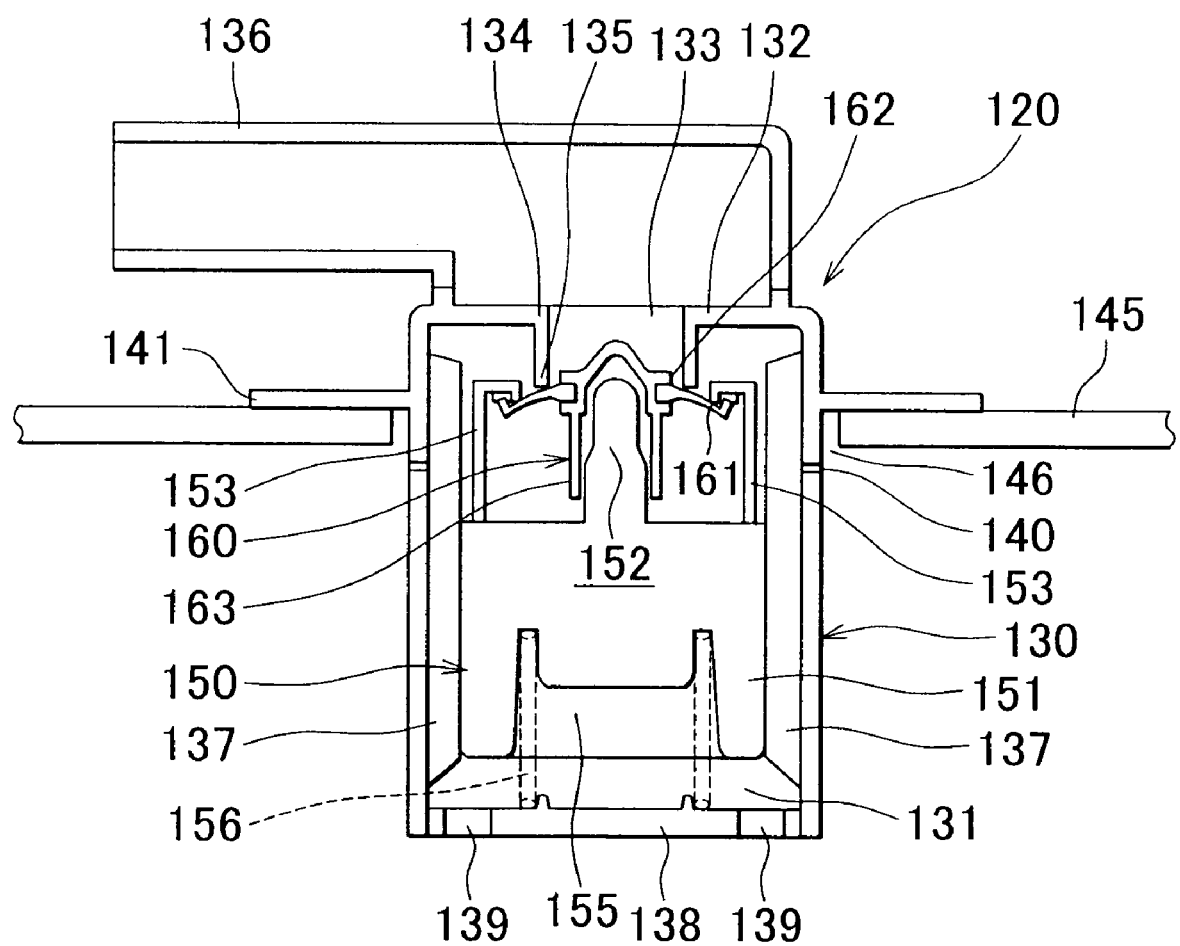
FIG. 3 illustrates the cross-sectional view showing the state where a part of the valve is forcibly pressed downward by a pressing portion of a valve opening member.
Figure 4:
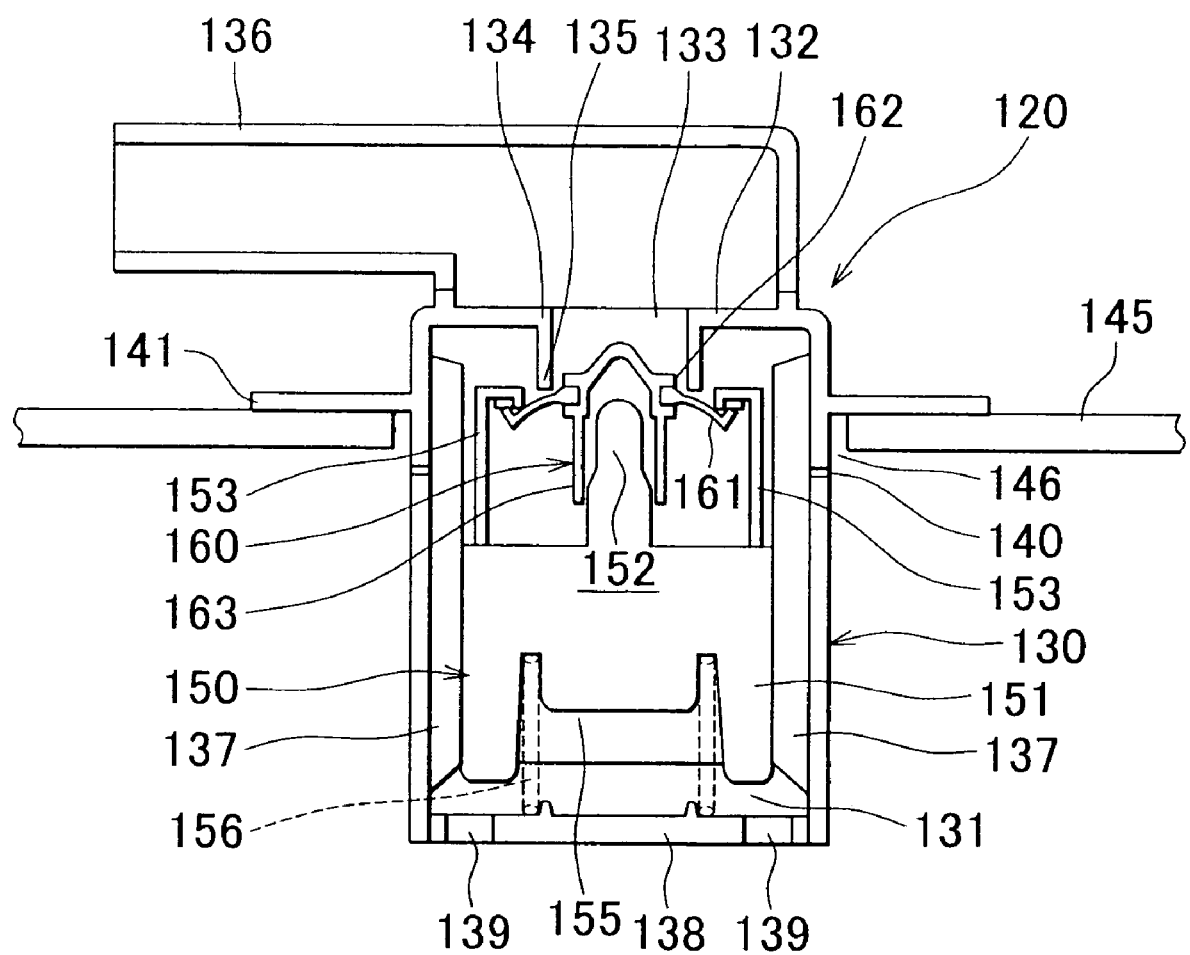
FIG. 4 illustrates the cross-sectional view showing the state where the part of the valve is opened forcibly by the pressing portion of the valve opening member.
Figure 5B:
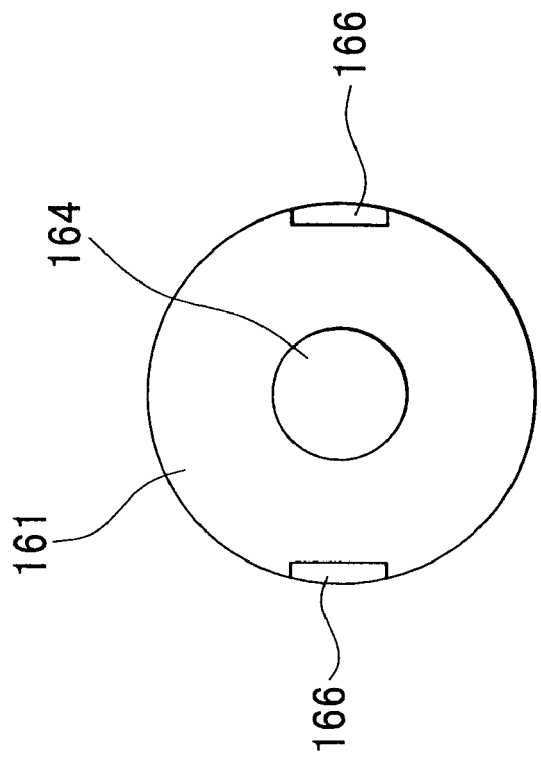
FIGS. 5A and 5B illustrate the plan views of different valves according to the first embodiment.
Figure 5A:
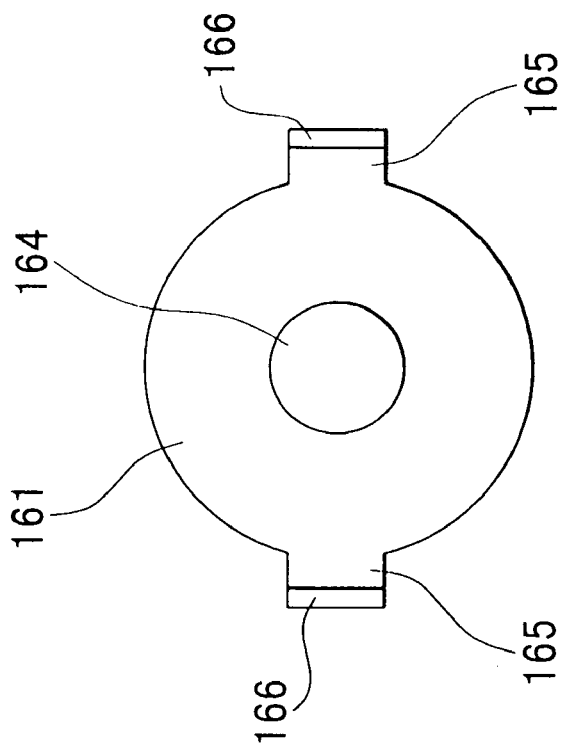
Figure 6A:
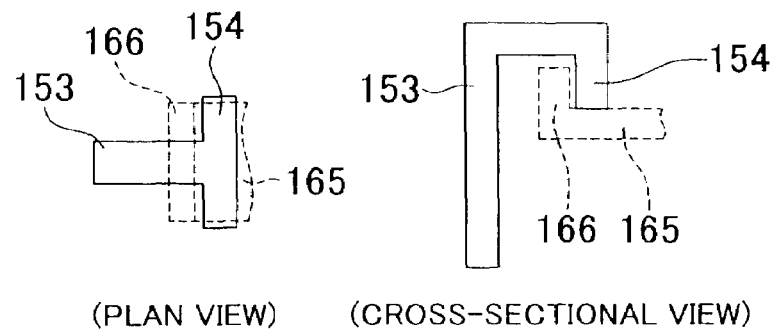
FIGS. 6A, 6B and 6C illustrate the cross-sectional views showing the relationship between respective three types of valve opening members and a projection portion of the valve.
Figure 6B:
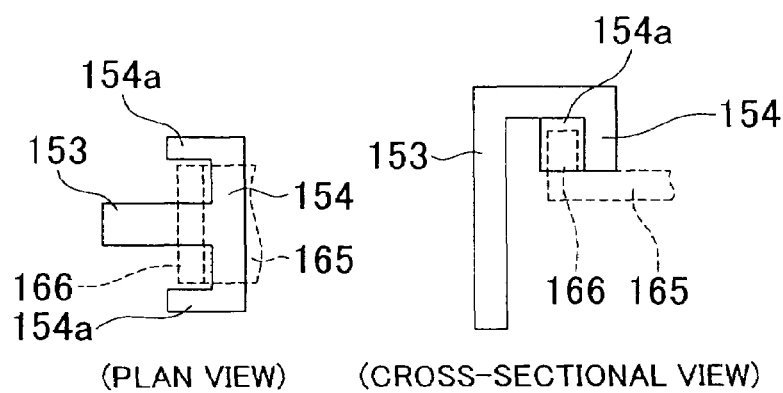
Figure 6C:
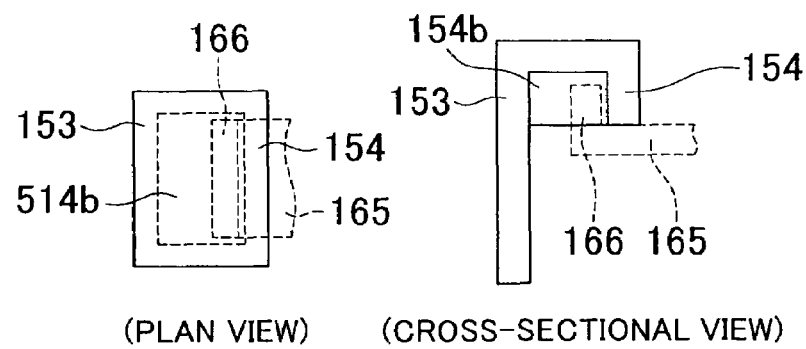

FIG. 1 illustrates the cross-sectional view of the entirety of a float valve, when a valve is closed. FIG. 2 illustrates the cross-sectional view taken along line A-A in FIG. 1. FIG. 3 illustrates the overall cross-sectional view showing the state where the float has moved downward from the position in FIG. 1, in which the valve is closed, and a part of the valve is moved slightly downward. FIG. 4 illustrates the overall cross-sectional view showing the state where the float has further moved downward from the position in FIG. 3, and the part of the valve is opened. FIG. 5A illustrates the plan view of the valve, and FIG. 5B illustrates the plan view of a valve according to a modified example. FIG. 6A illustrates the plan view and the cross-sectional view of a valve opening member. FIG. 6B illustrates the plan view and the cross-sectional view of a valve opening member according to a modified example. FIG. 6C illustrates the plan view and the cross-sectional view of a valve opening member according to another modified example. Although the uses of the float valve according to the invention is not limited, the following description will be made concerning the float valve used in a fuel system for a motor vehicle.

A float valve 120 includes a case 130, a float 150 arranged in the case 130, a valve support member 160, a flange 141 that is used to fit the case 130 to a fuel tank 145, and the like.

The case 130 is a cylindrical resin member that is open at the bottom. The case 130 has an internal space 131. A cylindrical body 134 is formed integrally with a top wall surface 132 of the case 130 at the center of the top wall surface 132. The cylindrical body 134 communicates with the internal space 131, and has an upper opening 133 at the center thereof. A communication pipe 136 that also serves as a cap is connected to an upper-end portion of the cylindrical body 134. Through the communication pipe 136, fuel evaporative gas in the fuel tank 145 is discharged to a canister (not shown), and the atmosphere is introduced into the fuel tank 145. A valve seat 135 is formed at the lower-end portion of the cylindrical body 134. A valve 161, which is fitted to the valve support member 160, contacts the valve seat 135.

Multiple ribs 137 are formed, in the vertical direction, along the inner wall surface of the case 130 with predetermined intervals. The ribs 137 are used to maintain a given space between the inner wall surface of the case 130 and the side wall surface of the float 150. Thus, multiple passages through which, for example, fuel evaporative gas flows are formed. The end portions of the ribs 137 guide the float 150 on its vertical movement.

A bottom plate 138 is fitted to a bottom portion of the case 130 by, for example, snap fitting or thermal welding. Multiple bottom openings 139, through which, for example, fuel can flow into the internal space 131, are formed in the bottom plate 138. The bottom openings 139 are formed to permit the fuel to flow into the internal space 131, for example, when refueling is performed or when the motor vehicle is tilted or overturned. With this structure, the float 150 moves upward using the fuel flowing into the internal space 131 at the time of, for example, refueling, and the upper opening 133 is blocked by the valve 161 provided above the float 150, whereby the fuel is prevented from being discharged to the canister.

Also, multiple communication holes 140 are formed in the upper portion of the side wall surface of the case 130. The fuel evaporative gas in the fuel tank 145 flows into the internal space 131 through the communication holes 140, and is discharged to the canister (not shown) through the upper opening 133 and the communication pipe 136. Also, the flange 141 is formed integrally on the side wall surface of the case 130 at the upper portion.

The reference numeral 145 denotes the fuel tank. A fitting hole 146 is formed in the top wall surface of the fuel tank 145. The case 130 is inserted into the fitting hole 146, and the flange 141 of the case 130 is then fitted to the top wall surface of the fuel tank 145. As a result, the float valve 120 is arranged in the fuel tank 145, as shown in FIG. 1.

The float 150 arranged in the case 130 is made of resin. The float 150 is hollow, has a substantially cylindrical shape, and is open at the bottom. A large-diameter cylindrical portion 151 is formed at the lower portion of the float 150, and a small-diameter cylindrical portion 152 is formed at the upper portion of the float 150. The diameter of the large-diameter cylindrical portion 151 is constant in the axial direction. The large-diameter cylindrical portion 151 moves vertically along the ribs 137 formed along the inner wall surface of the case 130. The small-diameter cylindrical portion 152 is a rod-like body having a small diameter. The upper-end portion of the small-diameter cylindrical portion 152 is formed in an arc-shape. The small-diameter cylindrical portion 152 pivotably supports the valve support member 160.

Two valve opening members 153, which face each other in the radial direction, are arranged on the top surface of the float 150 at positions near the periphery of the float 150. Each valve opening member 153 is provided with a horizontal portion, which is a rectangular or rod-shaped column member and whose end extends inwardly and substantially perpendicularly to the valve opening member 153; and a pressing portion 154 which extends from the end of the horizontal portion downward and perpendicularly to the horizontal portion. As shown in FIG. 6, the pressing portion 154 is broad in the lateral direction.

A bottom space 155 is formed in the bottom portion of the float 150. A spring 156, which assists the float 150 to move upward, is provided between the float 150 and the bottom plate 138.

The valve support member 160, to which the valve 161 is fitted, is fitted to the small-diameter cylindrical portion 152 of the float 150. The valve support member 160 is made of resin, and has a fitting groove 162 and a cylindrical body portion 163. The valve support member 160 is hollow, has a substantially cylindrical shape, and is open at the bottom. The fitting groove 162 is circularly formed in the upper portion of the side wall surface of the valve support member 160. The valve 161 is fitted to the fitting groove 162. The upper-end portion of the cylindrical body portion 163 is closed. The cylindrical body portion 163 is pivotably supported, at the closed surface, by the end portion of the small-diameter cylindrical portion 152 of the float 150. The inner diameter of the cylindrical body portion 163 is slightly larger than the outer diameter of the small-diameter cylindrical portion 152 of the float 150. Therefore, after the cylindrical body portion 163 is fitted to the small-diameter cylindrical portion 152, oscillation of the small-diameter cylindrical portion 152 in the lateral direction is suppressed, and the small-diameter cylindrical portion 152 can move smoothly in the vertical direction.

The outer diameter of the valve support member 160 is smaller than the inner diameter of the cylindrical body 134 that defines the upper opening 133. Therefore, the valve support member 160 moves upward so as to enter the cylindrical body 134, when the float 150 moves upward. As a result, the valve 161 contacts the valve seat 135 with a strong pressing force, providing sufficient sealing between the valve 161 and valve seat 135.

As shown in FIGS. 5A and 5B, the valve 161 is a circular and thin fluoro rubber member. A circular hole 164 is formed at the center of the valve 161. The valve 161 can be fitted in the fitting groove 162 of the valve support member 160 at the circular hole 164. Two rectangular projection portions 165, which face each other in the radial direction, are formed at two respective portions of the periphery of the valve 161, as shown in FIG. 5A. In addition, a projection portion 166 that extends upward is formed at the end of each rectangular projection portion 165. Such a structure makes it possible to set the outer diameter of the valve 161 to a minimum value, although the outer diameter of the valve 161 is slightly larger than the outer diameter of the cylindrical body 134. In addition, because the valve 161 can be opened by pressing down the rectangular projection portion 165 of the valve 161, the valve 161 can be opened with a small force. As shown in FIG. 5B, the projection portions 166 may be directly provided on the periphery of the valve 161 without providing the rectangular projection portions 165. Alternatively, the valve 161 without any projection portions 166 may be provided. In this case, the valve 161 may be fitted to the valve opening member 153 using, for example, a snap or an E-ring.

When the float 150 moves upward, the valve 161 contacts the valve seat 135 formed at the lower-end portion of the cylindrical body 134 of the case 130, thereby preventing, for example, the fuel from flowing to the upper opening 133.

FIGS. 6A to 6C illustrate various shapes of the pressing portion 154, and schematically show the relationship between the pressing portion 154 and the projection portion 166 of the valve 161 after assembly. After assembly, the pressing portion 154 is positioned on the inner side of the projection portion 166 of the valve 161. Accordingly, even if the operation for opening valve 161 is repeatedly performed by the pressing portion 154, the projection portion 166 of the valve 161 contacts the pressing portion 154. As a result, the peripheral portion of the valve 161 is prevented from moving to the inner side of the pressing portion 154. Also, in the process of opening the valve 161, the pressing portion 154 is engaged with the projection portion 166, and the projection portion 166 of the valve 161 is forcibly pressed downward. Therefore, the ease in opening the valve 161 is enhanced.

FIG. 6A illustrates the pressing portion 154 that linearly extends in the lateral direction. FIG. 6B and FIG. 6C illustrate the pressing portion 154 according to modified examples. In the structure shown in FIG. 6B, side wall portions 154*a* extending outward are provided on the respective side surfaces of the pressing portion 154. The projection portion 166 of the valve 161 is surrounded by three wall surfaces, that are, the pressing portion 154 and the side wall portions 154*a*. Arranging the side wall portions 154 on the respective side surfaces of the projection portion 166 of the valve 161 prevents turning of the valve 161.

In the structure shown in 6C, the pressing portion 154 and the valve opening member 153 define a space 154*b* having a rectangular cross section. As in the structure shown in FIG. 6B, the projection portion 166 of the valve 161 is surrounded by three wall surfaces, that are, the inner wall surface and the both side surfaces.

Assembly of the float valve 120 is performed in the following manner. First the valve 161 is fitted in the fitting groove 162 of the valve support member 160, whereby the valve support member is completed. Next, the valve support member 160 is fitted to the small-diameter cylindrical portion 152 of the float 150. In the process of fitting the valve support member 160 to the small-diameter cylindrical portion 152, the projection portion 166 of the valve 161 is pressed downward by hands to be placed on the outer side of the pressing portion 154 of the valve opening member 153. Thus, a float unit is completed. Next, the case 130 is turned upside-down. Then, the float unit is turned upside-down and inserted in the internal space 131 of the case 130. After this, the coil spring 156 is inserted in the bottom space 155 of the float 150. Then, the bottom plate 138 is fixed to the bottom portion of the case 130 by, for example, an adhesive agent or welding, whereby the case 130 is closed. At this time, one end portion of the spring 156 contacts the top surface of the bottom plate 138. After assembly of the float valve 120, the float valve 120 is inserted in the fuel tank 145, while standing upright. Then, the flange 141 is fixed to the top wall surface of the fuel tank 145. In this state, the float valve 120 is used.

Next, the effects of the float valve 120 according to the first embodiment will be described. Usually, the fuel evaporative gas generated in the fuel tank 145 flows into the internal space 131 through the bottom openings 139 and the communication holes 140, and is then discharged to the canister through the upper opening 133 and the communication pipe 136. Even if the fuel tank 145 oscillates and the fuel blocks the bottom openings 139, the fuel evaporative gas is discharged smoothly, because the communication holes 140 are formed in the upper portion of the case 130.

When refueling is performed or when the vehicle moves vertically, or turns, if the fuel flows into the internal space 131 through the bottom openings 139, the fuel flows through the internal space 131 formed between the inner wall surface of the case 130 and the side wall surface of the float 150, and flows toward the communication pipe 136 through the upper opening 133.

However, the fuel flowing in the internal space 131 presses the float 150 upward. In addition, a buoyant force and an urging force of the spring 156 are applied to the float 150. Accordingly, the float 150 immediately moves upward together with the valve support member 160, and the valve 161 contacts the valve seat 135, thereby providing sealing between the valve 161 and the valve seat 135.

Generally, a force with which a valve contacts a valve seat increases in proportion to the diameter of the valve seat. The valve seat 135 in the first embodiment has a relatively large diameter, and, therefore, the force with which the valve 161 contacts the valve seat 135 is great. Accordingly, if the pressure in the fuel tank 145 is reduced by only a small amount, the valve 161 does not easily move away from the valve seat 135.

When the fuel tank 145 is filled up with fuel, the pressure in the fuel tank 145 is high, and the valve 161 contacts the valve seat 135 using this high pressure. Accordingly, if the pressure in the fuel tank 145 is reduced by only a small amount, the valve 161 does not move away from the valve seat 135. However, the float 150 contacts the valve support member 160 only at the end portion of the small-diameter cylindrical portion 152, which has a small area. Accordingly, when the fuel level is lowered even by only a small amount in the fuel tank 145, the small-diameter cylindrical portion 152 moves away from the valve support member 160, and the float 150 moves downward due to its own weight.

Then, the pressing portion 154 of the valve opening member 153 fitted integrally to the float 150 contacts the rectangular projection portion 165 that is a part of the valve 161. Then, the rectangular projection portion 165 is pressed downward as shown in FIG. 3, and the pressed portion of the valve 161 is forcibly opened, whereby communication is provided between the upper opening 133 and the internal space 131. Accordingly, the high-pressure in the fuel tank 145 is reduced immediately. As a result, the valve support member 160 moves downward, and the upper opening 133 is fully opened.

As described above, the outer diameter of the valve support member 160 is smaller than the inner diameter of the cylindrical body 134 that defines the upper opening 133. Accordingly, if the force with which the float 150 moves upward increases, the valve support member 160 deeply enters the cylindrical body 134. As a result, the valve 161 deforms more than necessary, and sealing performance of the valve 161 may be lowered.

Figure 7:
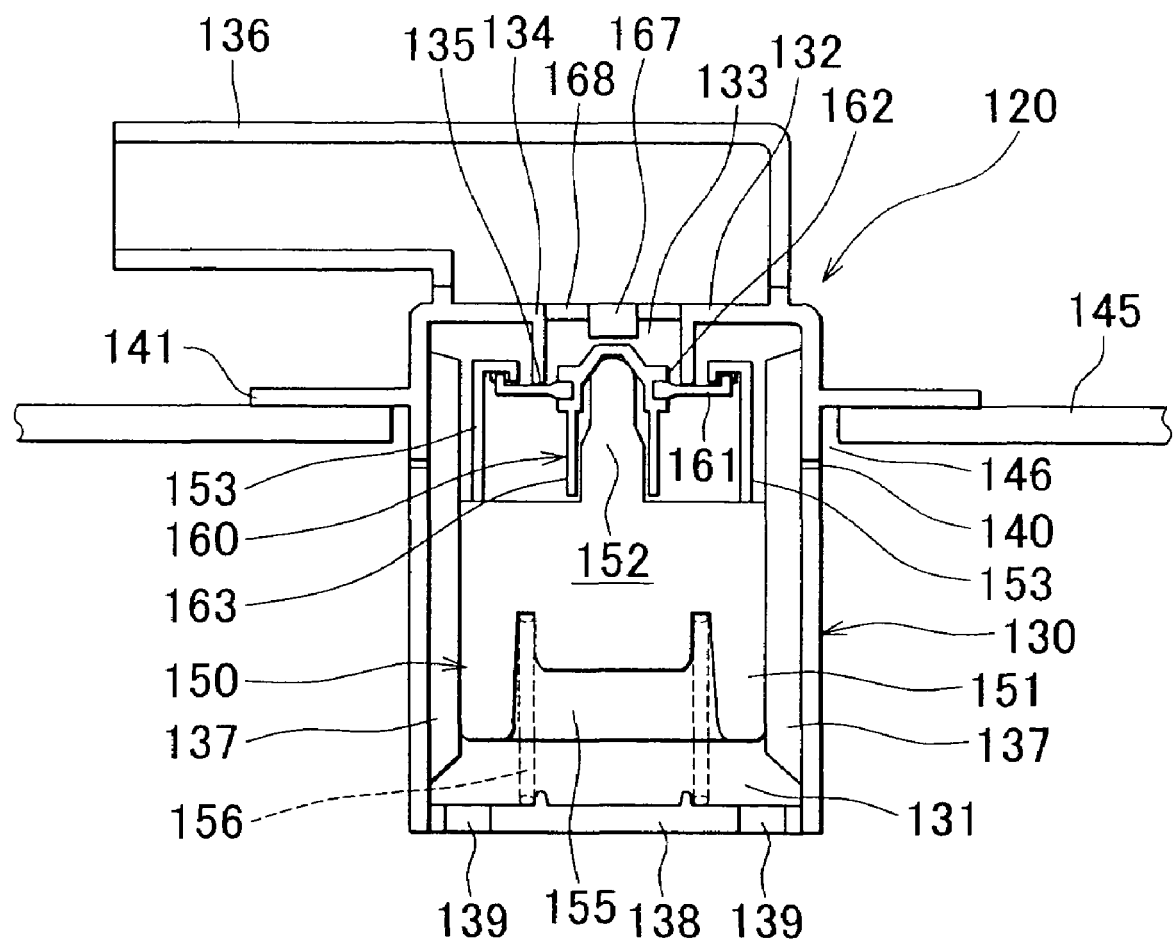
FIG. 7 illustrates the cross-sectional view showing the entirety of a float valve according to a modified example of the first embodiment, when the valve is closed.
Figure 8:
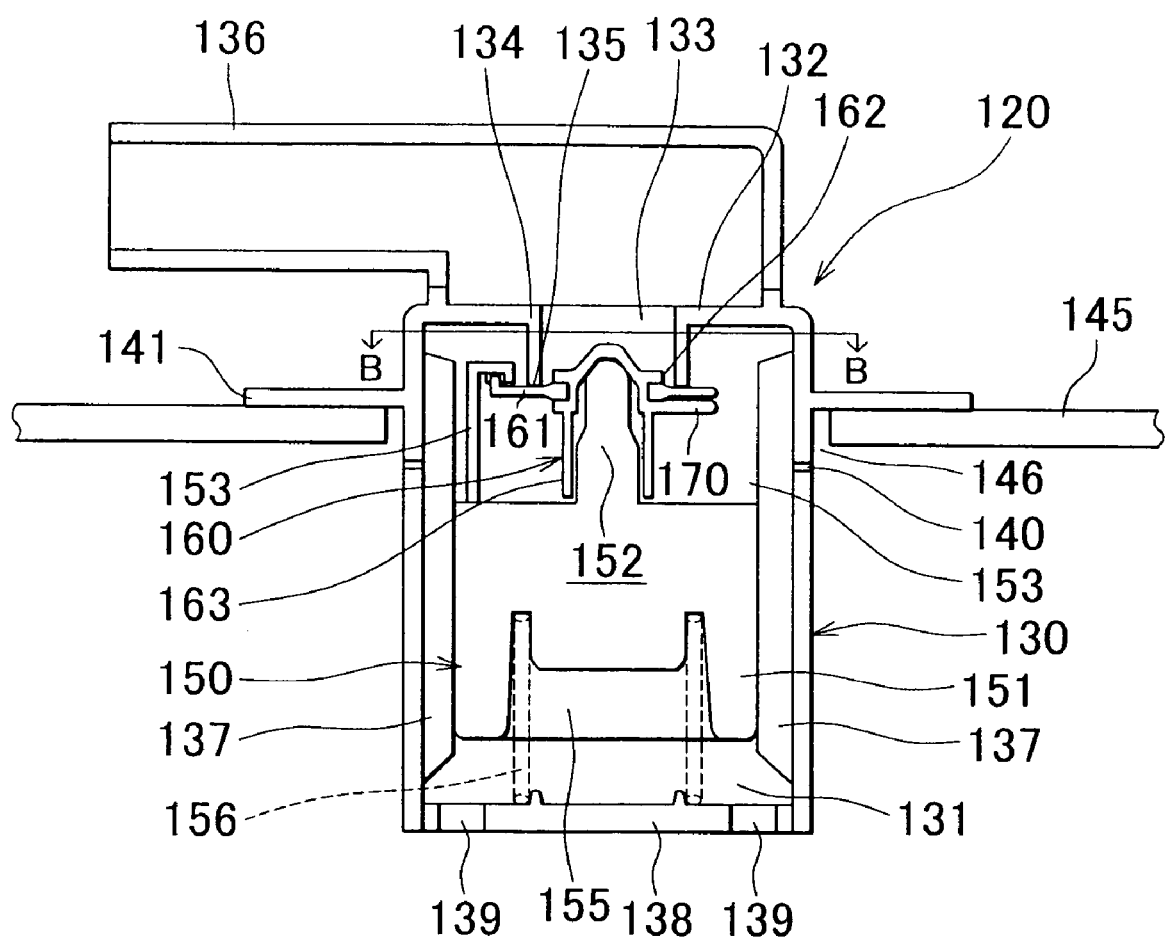
FIG. 8 illustrates the cross-sectional view, taken along line C-C in FIG. 9, of a float valve according to another modified example of the first embodiment, when the valve is closed.

FIGS. 7 and 8 illustrate modified examples in which the valve support member 160 is prevented from deeply entering the cylindrical body 134. In the modified example shown in FIG. 7, a stopper 167 is provided to prevent the valve support member 160 from entering the upper opening 133 more than necessary. The stopper 167 is a cylindrical member that is provided at a predetermined position in the central area of the cylindrical body 134. The stopper 167 is supported by four rod-like or plate-like support pieces 168 that extend from the periphery of the stopper 167 in a radial pattern and at predetermined intervals. Accordingly, the valve support member 160 cannot move upward more than necessary, because the valve support member 160 contacts the stopper 167.

Figure 9:
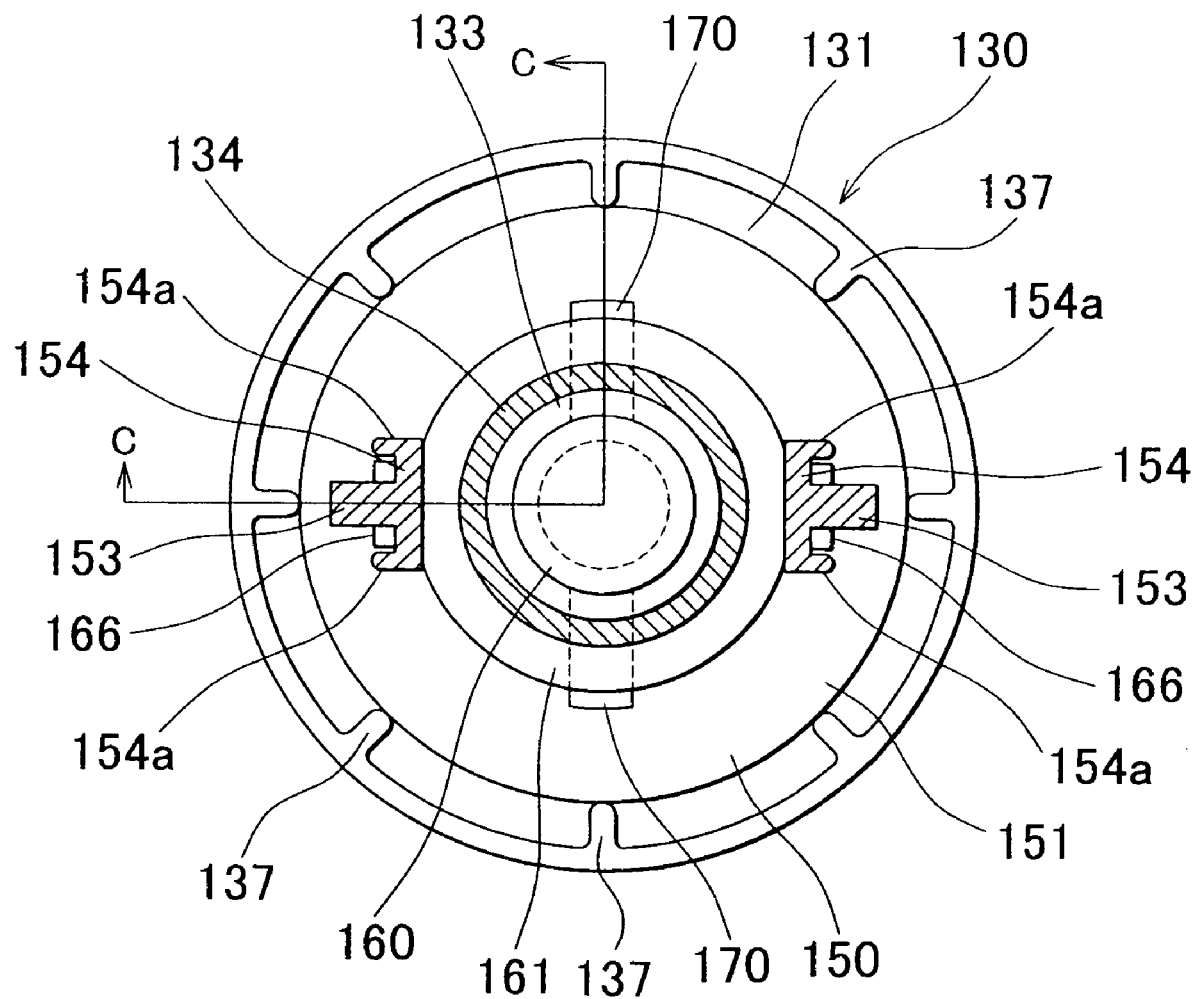
FIG. 9 illustrates the cross-sectional view taken along line B-B in FIG. 8.
Figure 10:
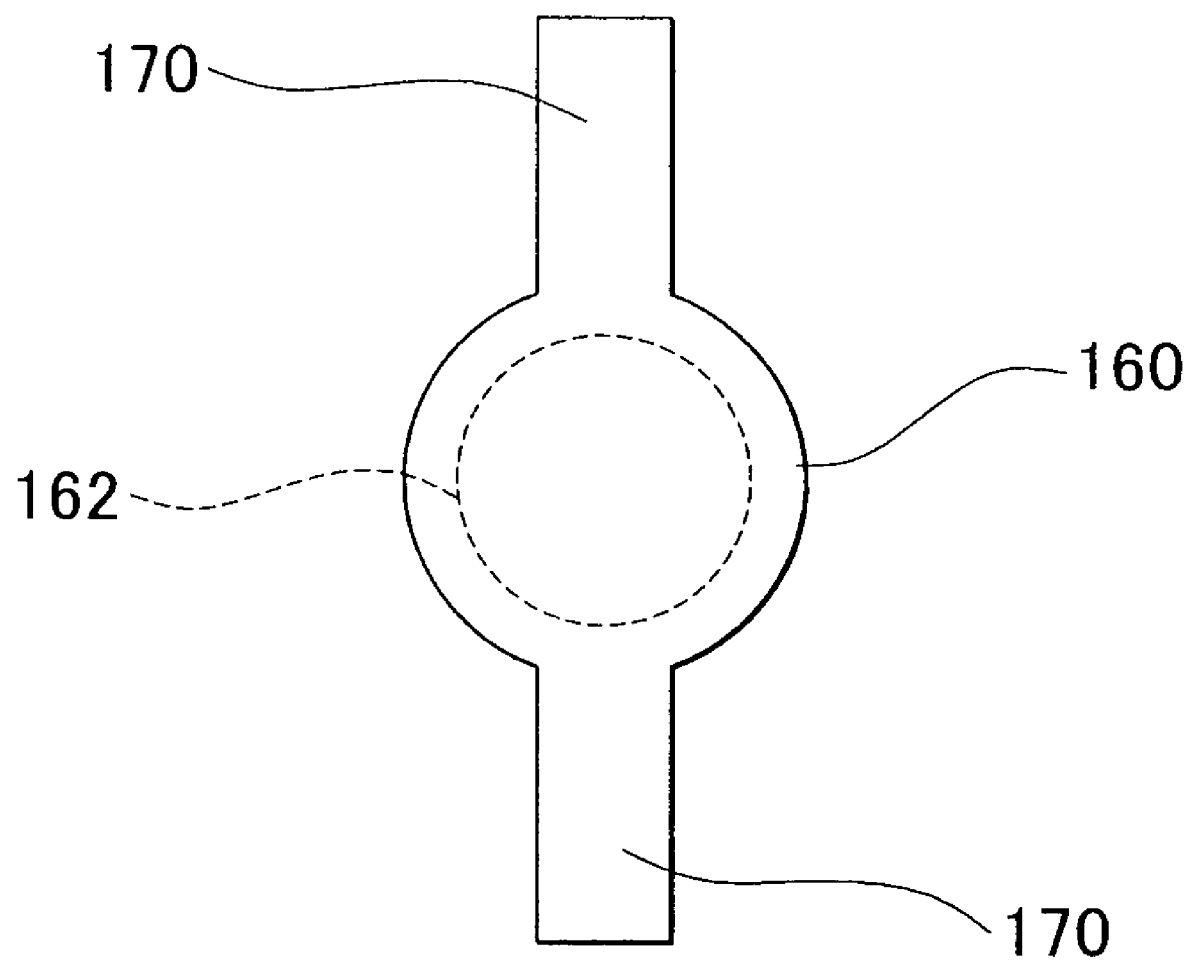
FIG. 10 illustrates the plan view of a stopper.

In the modified example shown in FIG. 8, stoppers 170, which extend from the outer wall surface of the valve support member 160, at positions near the lower portion of the valve 161. The stoppers 170 prevent the valve support member 160 from entering the upper opening 133 more than necessary. As shown in FIGS. 8 and 10, the stoppers 170 are two plate-like members that horizontally and radially extend in the opposite directions. The two plate-like members extend from the respective two portions of the outer wall surface of the valve support member 160, which are slightly below the positions at which the valve 161 is fitted to the valve support member 160. As shown in FIG. 9, the two stoppers 170 are arranged perpendicularly to the line connecting the two valve opening members 153 of the float 150. Also, the length between the outer ends of the two stoppers 170 is longer than the diameter of the cylindrical body 134. FIG. 9 illustrates the cross-sectional view taken along line B-B in FIG. 8. FIG. 8 illustrates the cross-sectional view taken along line C-C in FIG. 9. The stopper 170 thus configured can prevent the valve support member 160 from entering the cylindrical body 134 more than necessary.

FIGS. 11 to 16 illustrate other modified examples. In the structures shown in FIGS. 1 to 10, because any obstacle is not provided below the rectangular projection portion 165 of the valve 161 that contacts the pressing portion 154 of the valve opening member 153, the rectangular projection portion 165 appropriately deforms downward. However, if the rectangular projection portion 165 repeatedly receives the force applied in the vertical directions, the elasticity of the rubber of the rectangular projection portion 165 is reduced, and the rectangular projection portion 165 may not return to the original state. If such a problem occurs, reliability of the product is considerably reduced. With the structure according to the modified example, however, such a problem can be avoided.

The characterizing portions of the modified example will be described. The other portions are the same as those in FIGS. 1 to 10. In the structure according to this modified example, a wall body 175 is formed integrally on the top surface of the float 150. The wall body 175 extends up to the position at which the bottom portion of the valve 161 contacts the top surface of the float 150. In addition, a valve opening member 180 is formed separately from the float 150.

Figure 11:
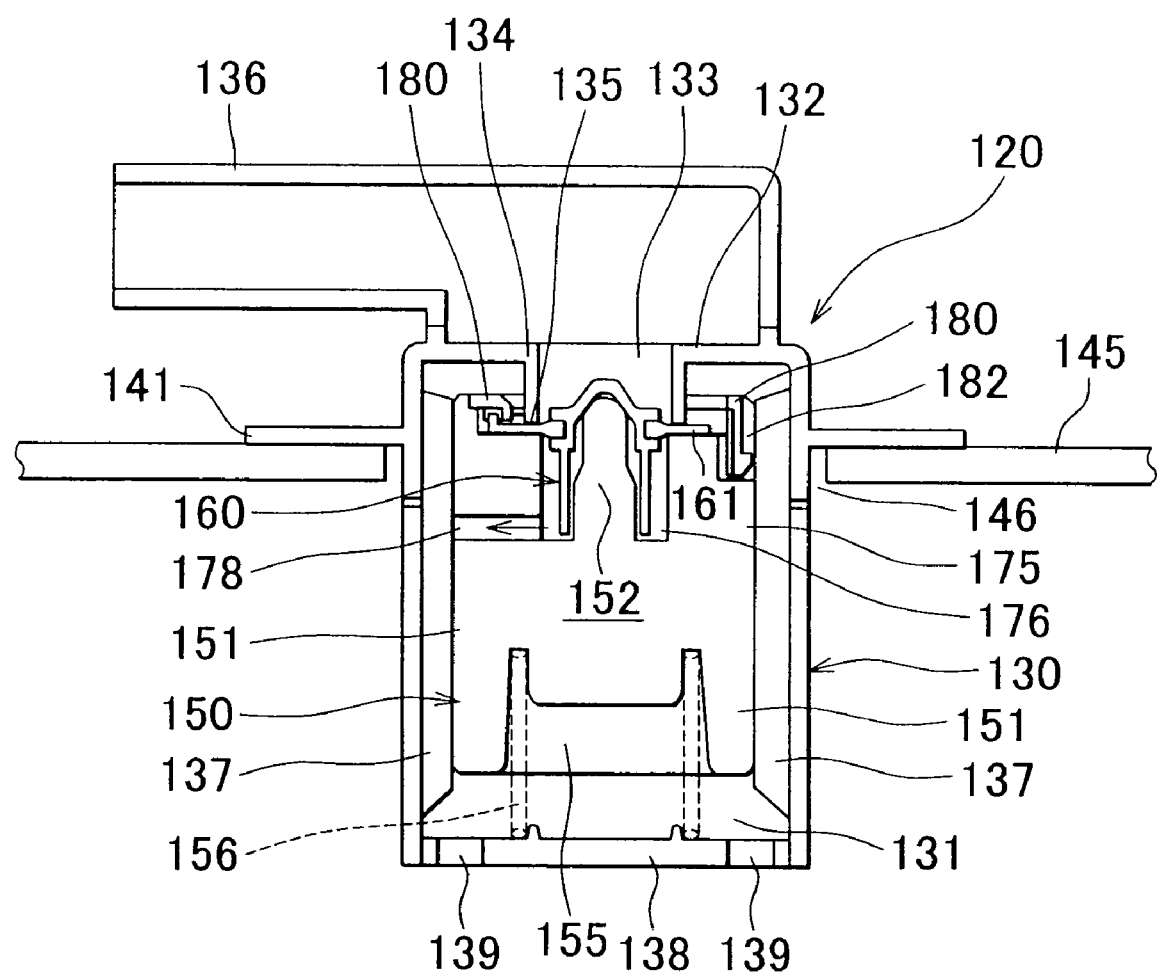
FIG. 11 illustrates the cross-sectional view of the entirety of a float valve according to another modified example of the first embodiment, when the valve is closed.
Figure 12:
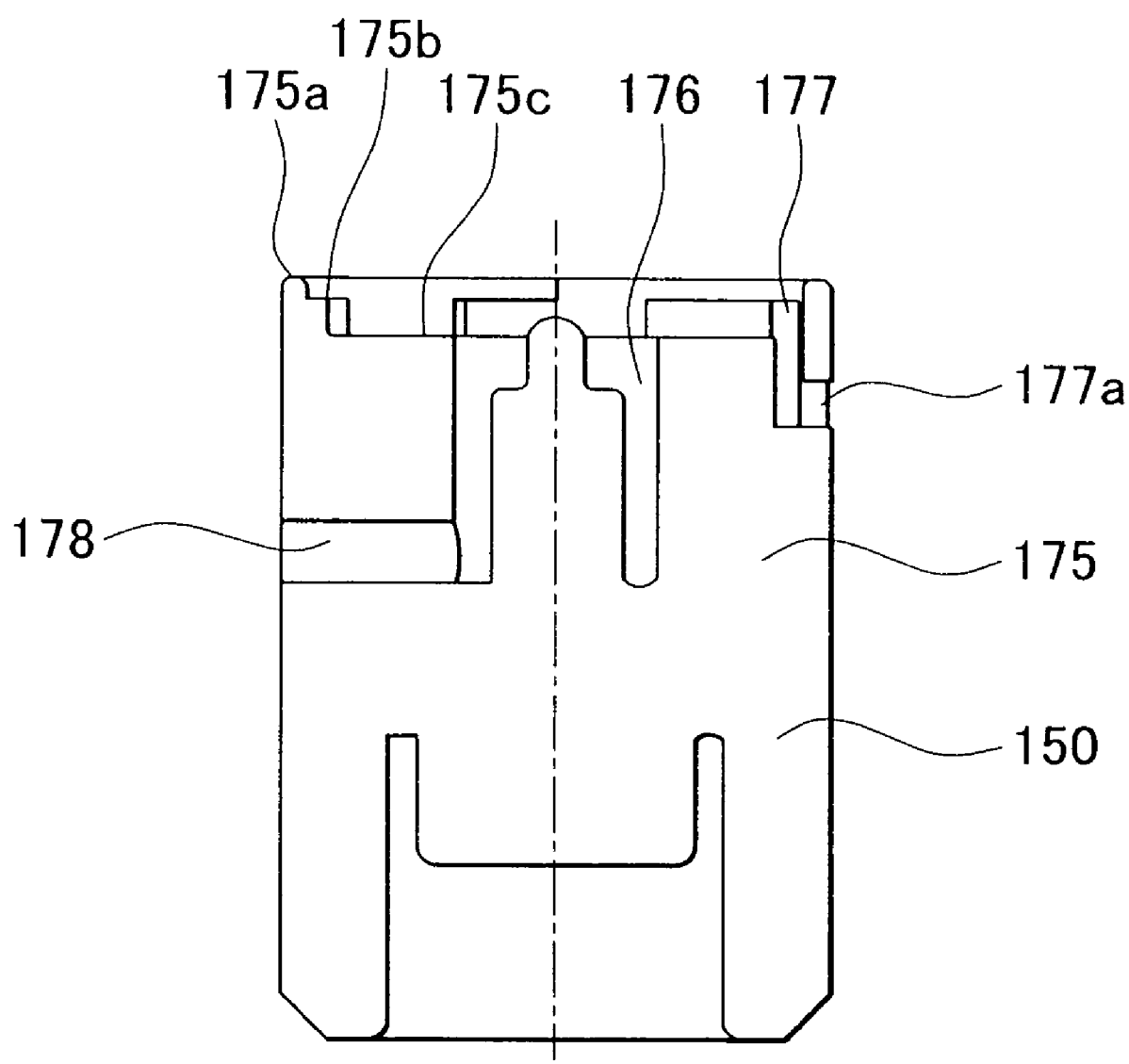
FIG. 12 illustrates the cross-sectional view of a float in FIG. 11.
Figure 13:
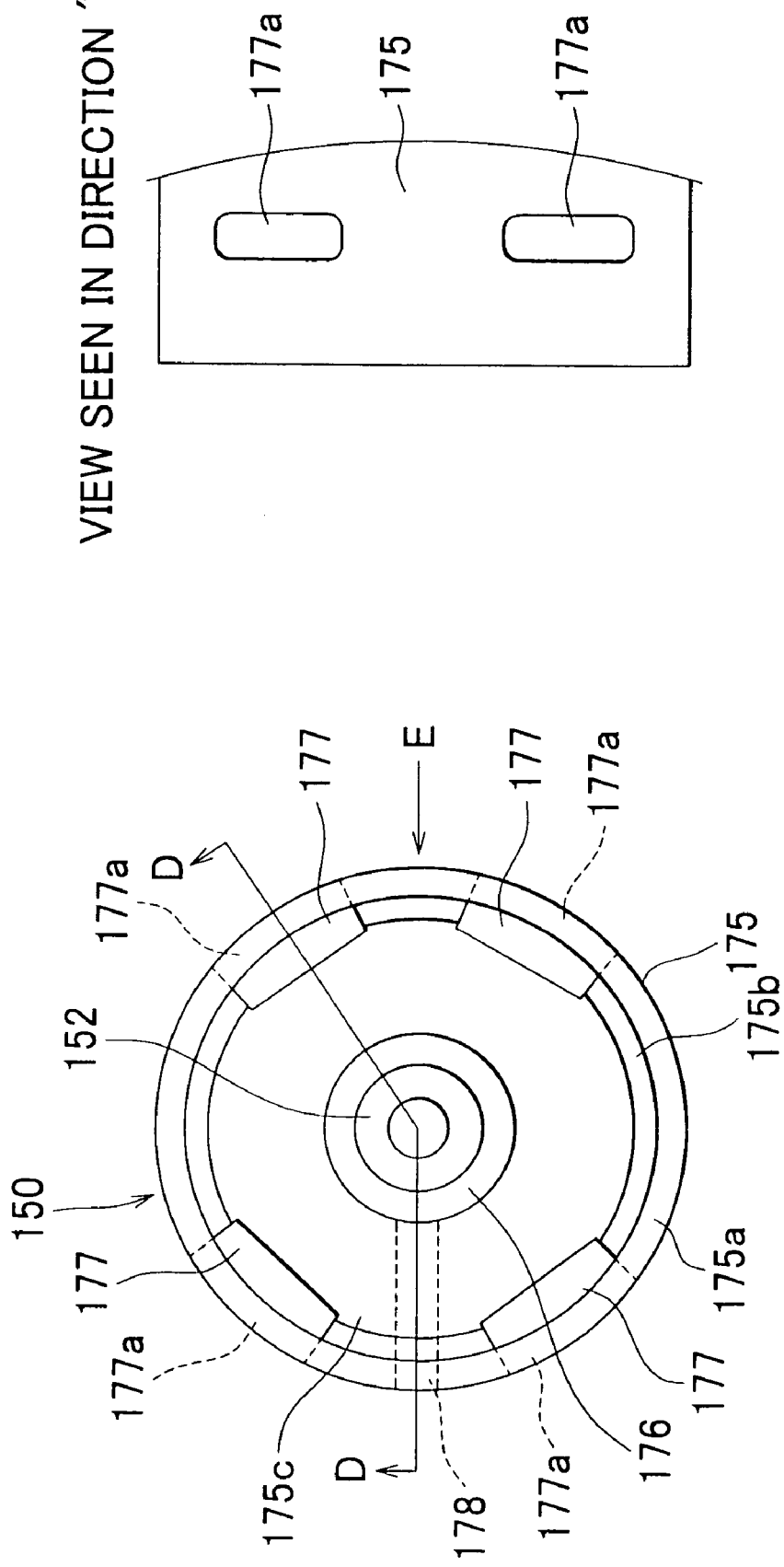
FIGS. 13A illustrates the plan view of the float in FIG. 12.
FIG. 13B illustrates the side view of a part of the float in FIG. 12.
Figure 14:
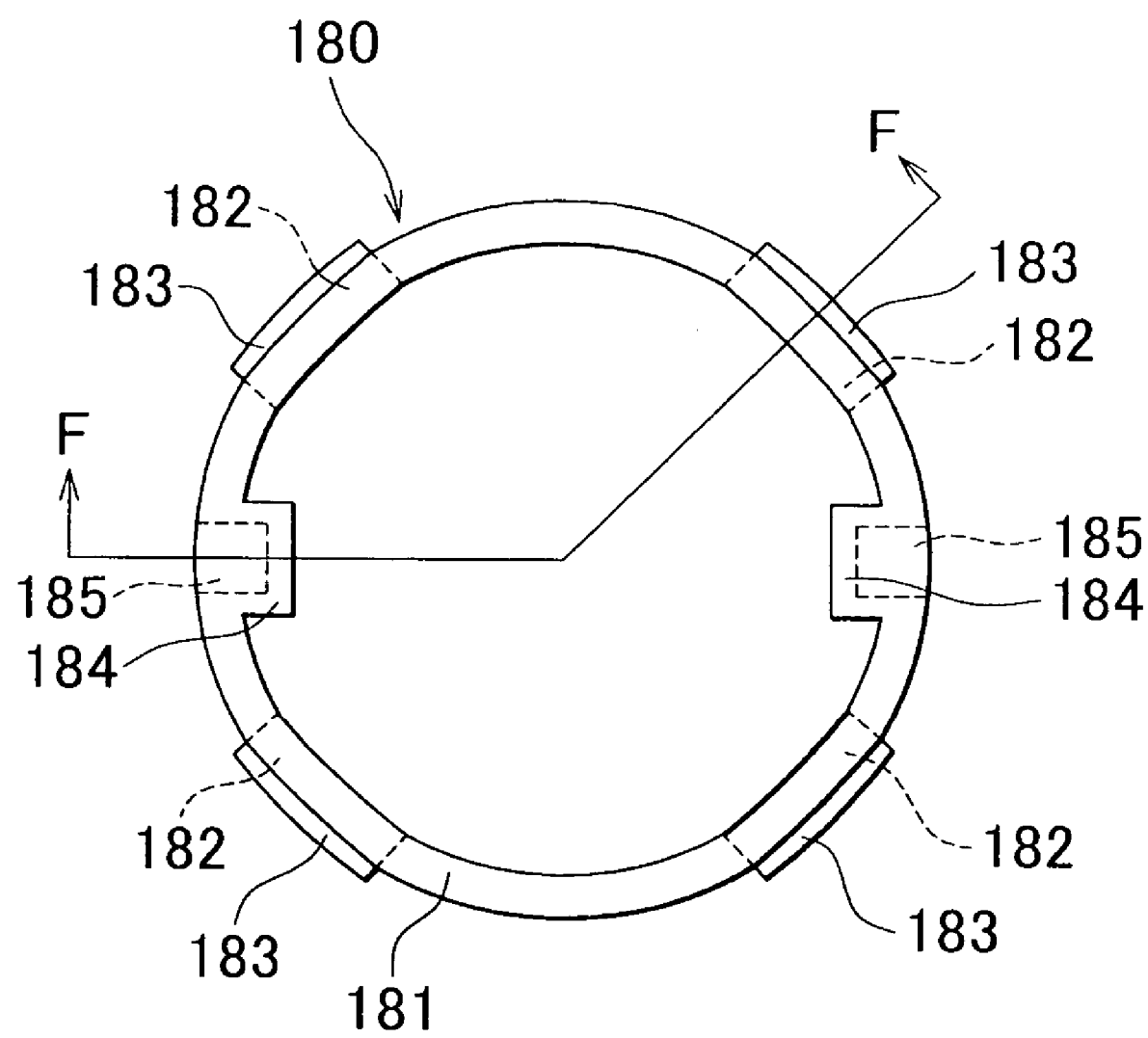
FIG. 14 illustrates the plan view of a valve opening member in FIG. 12.
Figure 15:
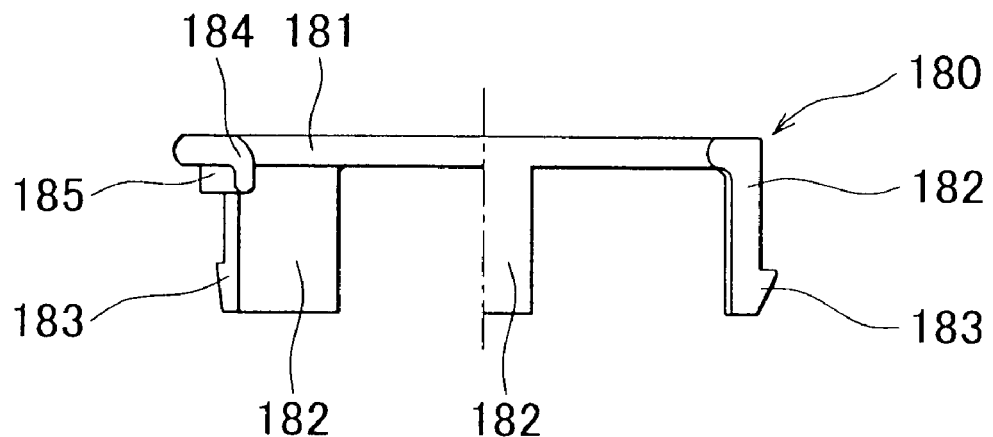
FIG. 15 illustrates the front view of the valve opening member in FIG. 12.
Figure 16:
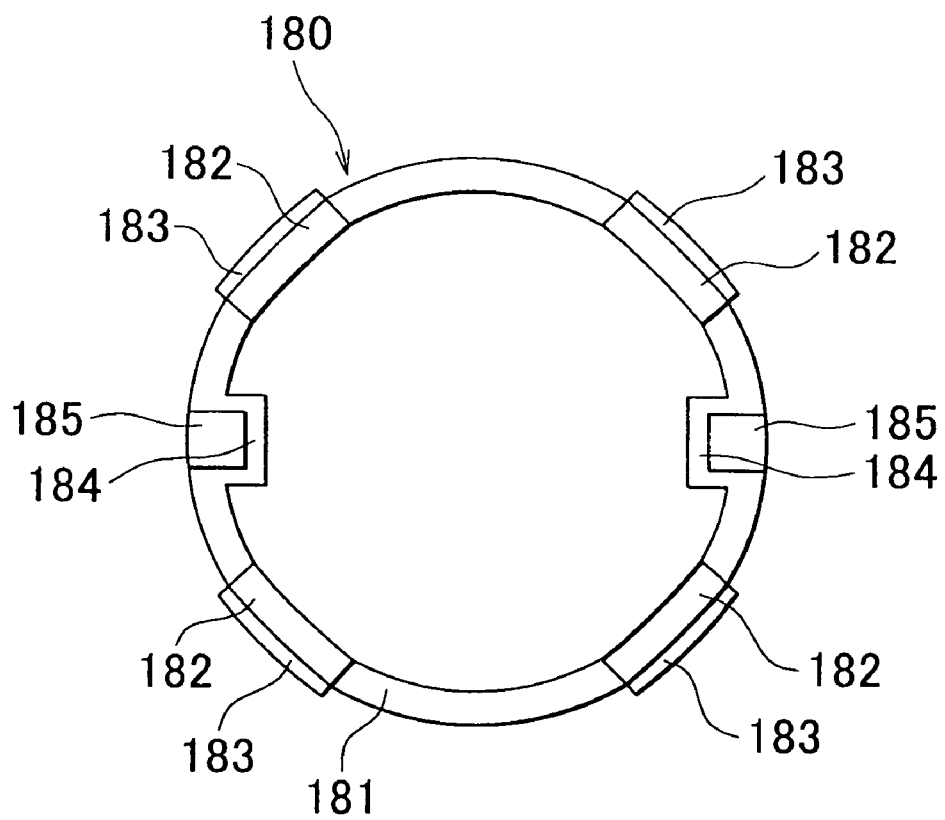
FIG. 16 illustrates the bottom view of the valve opening member in FIG. 12.

FIG. 11 illustrates the cross-sectional view, taken along line D-D in FIG. 13A and line F-F in FIG. 14, of the entirety of the float valve 120. FIG. 12 illustrates the cross-sectional view of the float 150, taken along line D-D in FIG. 13A. FIG. 13A illustrates the plan view of the float 150. FIG. 13B illustrates the side view of the float 150 viewed from the direction "E" in FIG. 13A. FIG. 14 illustrates the plan view of the valve opening member 180. FIG. 15 illustrates the side view of the valve opening member 180. FIG. 16 illustrates the bottom surface of the valve opening member 180.

As shown in FIG. 12, the wall body 175 is formed integrally on the top surface of the float 150. On the top surface of the wall body 175, an annular top portion 175a, which is the highest portion in the wall body 175, is formed on the peripheral portion, an annular middle portion 175b, which is slightly lower than the top portion 175a, is formed on the inner side of the top portion 175a, and an annular lower portion 175c, which is lower than the middle portion 175b, is formed on the inner side of the middle portion 175b. A center vertical groove 176, whose length is substantially equal to the entire height of the float 150, is formed between the lower portion 175c and the small-diameter cylindrical portion 152. A communication passage 178, which horizontally extends from the bottom portion of the center vertical groove 176 to the outer side surface of the float 150, is formed in the radial direction.

On the inner side of the top portion 175a, peripheral vertical grooves 177 are formed at four positions, as shown in FIG.

13A. In addition, side openings 177a, which extend from the bottom portions of the respective peripheral vertical grooves 177 to the outer side surface of the float 150, are formed in the radial direction.

After assembly, the bottom surface of the valve opening member 180 is arranged on the top surface of the middle portion 175b. The bottom portion of the valve 161 is arranged on the top surface of the lower portion 175c. Supporting legs 182 of the valve opening member 180 are fitted in the respective peripheral vertical grooves 177 and side openings 177a. The fuel that accumulates in the center vertical groove 176 is returned to the internal space 131 through the communication passage 178.

The valve opening member 180 is a resin member including a body portion 181 and the supporting legs 182. The valve opening member 180 is formed separately from the float 150. The body portion 181 is an annular member. The bottom portion of the body portion 181 is arranged on the middle portion 175b of the wall body 175 after the valve opening member 180 is fitted to the float 150. The four supporting legs 182 extend downward from the bottom portion of the body portion 181 at the positions corresponding to the respective peripheral vertical grooves 177 formed in the wall body 175. In addition, a latch piece 183, which extends outward in the radial direction and has an L-shaped cross section, is formed at the bottom portion of each supporting leg 182. The width of the supporting leg 182 is smaller than the width of the peripheral vertical groove 177. The length between the ends of the two latch pieces 183, which face each other in the radial direction, is slightly longer than the length between the peripheral portions of the two peripheral vertical grooves 177, which face each other in the radial direction.

In addition, the body portion 181 is provided with two pressing portions 184, which are the substantially same as those shown in FIG. 6C. The two pressing portions 184 face each other in the radial direction. Each pressing portion 184 has an open space 185 in the lower potion. When the projection portion 166 of the valve 161 is inserted in the open space 185, the projection portion 166 of the valve 161 is surrounded by the inner wall surface and the both side surfaces.

If the valve opening member 180 is formed integrally with the float 150, it takes a lot of trouble and time to fit the valve opening member 180 to the valve 161. However, in the above-mentioned structure, the valve opening member 180 and the float 150 are formed separately. Accordingly, the time required for assembly can be considerably reduced, although the cost somewhat increases.

The assembly is performed in the following manner. First, the valve 161 is fitted in the fitting groove 162 of the valve support member 160, whereby the valve support member 160 is completed. The valve support member 160 is fitted to the small-diameter cylindrical portion 152 of the float 150. The valve support member 160 is arranged such that the two projection portions 166 of the valve 161 are positioned on the line connecting the center portions of the two narrower portions between the peripheral vertical grooves 177. Next, the valve opening member 180 is placed above the float 150, and the four supporting legs 182 of the valve opening member 180 are fitted in the respective four peripheral vertical grooves 177 of the wall body 175. In this case, the outer portions of the latch pieces 183 provided at the bottom of the supporting legs 182 are caught at the inner portions of the respective peripheral vertical grooves 177, and the float 150 does not move downward. When the supporting legs 182 are further inserted in the respective peripheral vertical grooves 177, the supporting legs 182 are pressed into the respective peripheral vertical grooves 177. Then, the bottom portion of the body portion 181 contacts the top surface of the middle portion 175b, and the latch pieces 183 of the respective supporting legs 182 enter the side openings 177a, and are fixed at these positions. Once fixed, the latch pieces 183 are not removed from the respective side openings 177a, even if the valve opening member 180 is just moved upward.

After assembly, as described above, the bottom portion of the body portion 181 contacts the top surface of the middle portion 175b, and the lower-end portions of the pressing portions 184 are positioned above the top surface of the valve 161 with a small clearance. The valve opening member 180 is removed from the wall body 175 by pressing the ends of the latch pieces 183 of the supporting legs 182 into the respective side openings 177a to remove the latch pieces 183 from the respective side openings 177a, and moving the valve opening member 180 upward.

In the modified example, the wall body 175 moves vertically together with the valve opening member 180 with the valve 161 placed on the top surface of the wall body 175. Accordingly, even if the restoring force of the valve 161 is reduced due to the pressing force repeatedly applied by the pressing portions 184, the valve 161 remains on the top surface of the wall body 175. As a result, the subsequent problem due to the reduction in the restoring force can be reliably avoided. In the modified example, the wall body 175 has a seamless cylindrical shape. However, the wall body 175 need not have such a seamless cylindrical shape, as long as the wall body 175 is arranged at least below the pressing portions 184.

Figure 17:
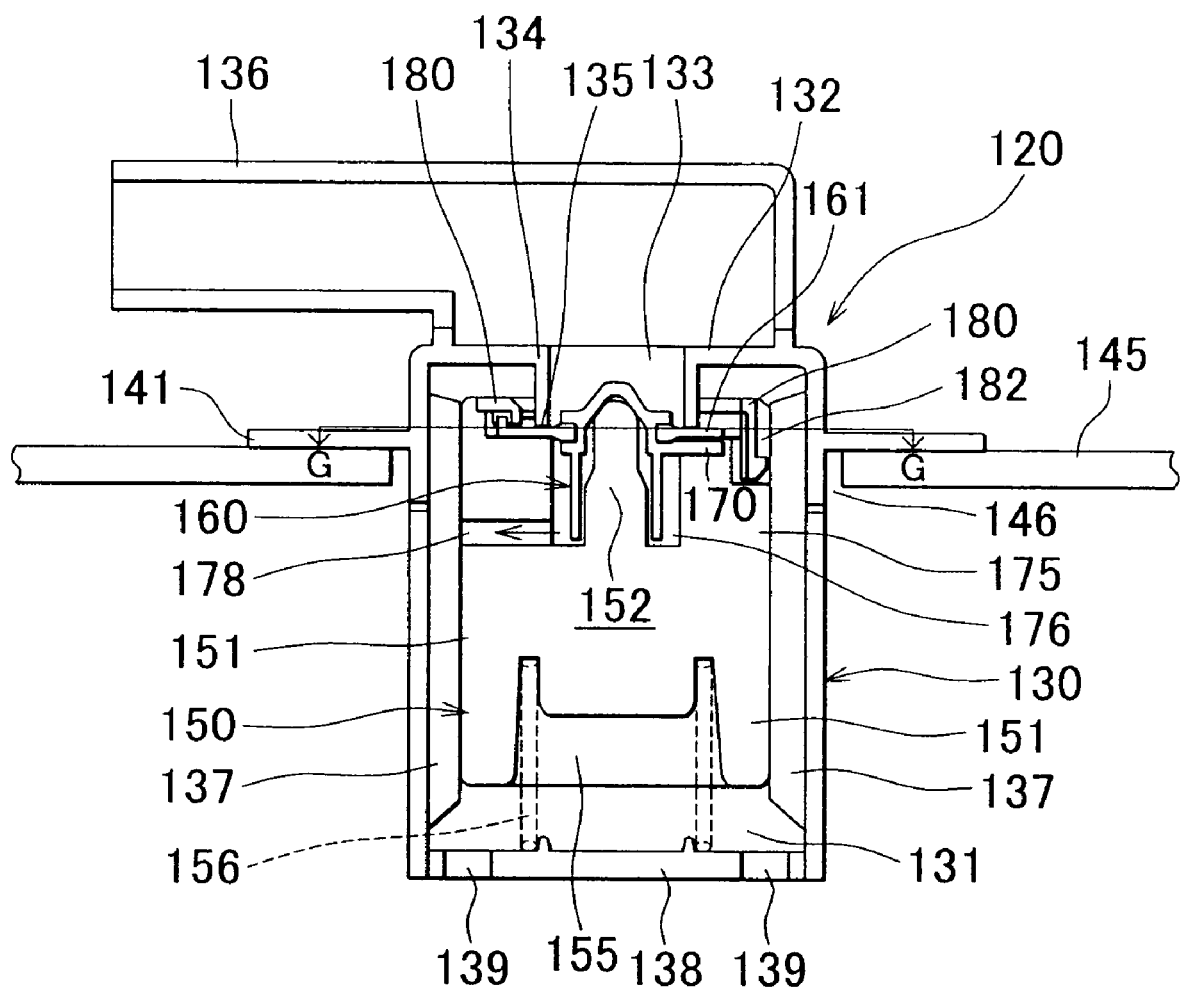
FIG. 17 illustrates the cross-sectional view, taken along line H-H in FIG. 18, of a float valve according to another modified example of the first embodiment, when the valve is closed.
Figure 18:
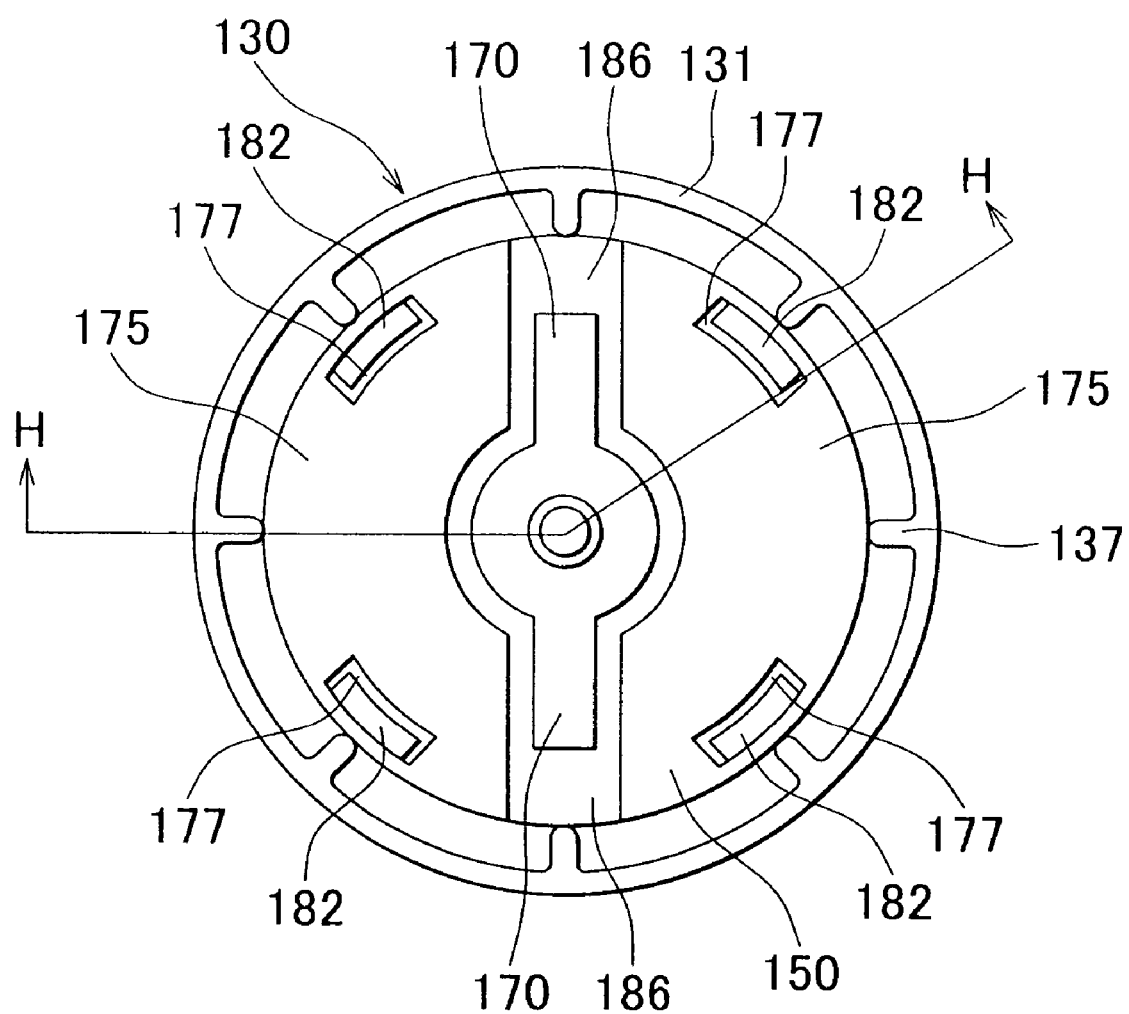
FIG. 18 illustrates the cross-sectional view taken along line G-G in FIG. 17.

FIGS. 17 and 18 illustrates a modified example of the float valve 120 in FIG. 11. In this modified example, the stopper 170 having the same structure as that in FIG. 8 is provided in the float valve 120 in FIG. 11, whereby the valve support member 160 is prevented from entering the upper opening 133 more than necessary. FIG. 17 illustrates the cross-sectional view of the entirety of the float valve 120 according to the modified example. FIG. 18 illustrates the plan view taken along line G-G in FIG. 17. FIG. 17 illustrates the cross-sectional view taken along line H-H in FIG. 18.

The structure shown in FIGS. 17 and 18 differs from the structure in FIG. 11 in that the wall body 175 is partitioned into a right wall body 175 and a left wall body 175. A radial-direction groove 186 is formed between the two wall bodies 175, 175. The stoppers 170 same as those in FIG. 8 are arranged along the radial-direction groove 186 at the positions same as those in the valve support member 160. The length between the outer ends of the stoppers 170 is longer than the outer diameter of the cylindrical body 134. With this arrangement, the valve support member 160 can be prevented from entering the upper opening 133 more than necessary, as in the example shown in FIG. 8.

Figure 19:
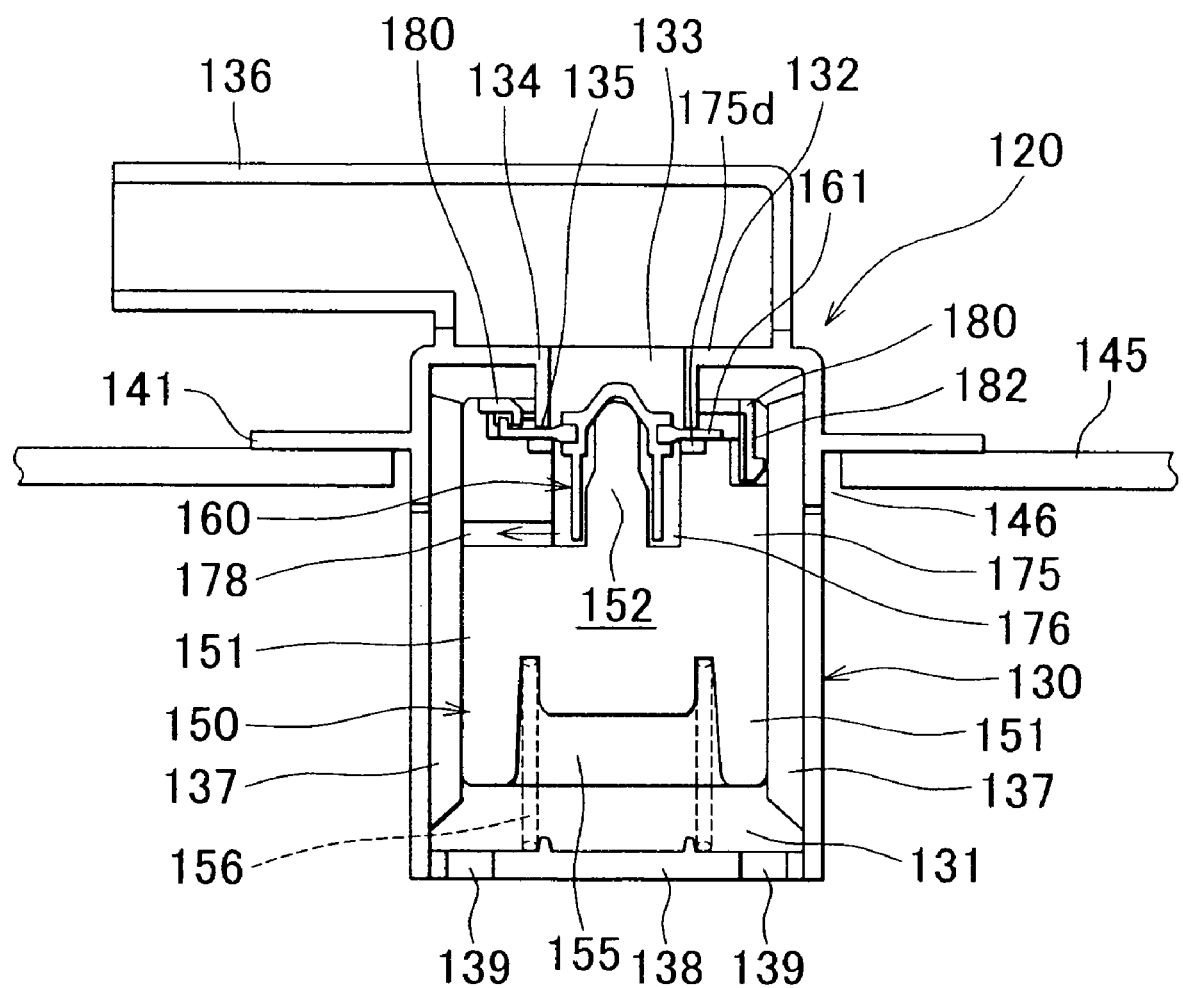
FIG. 19 illustrates the cross-sectional view of the entirety of a float valve according to another modified example of the first embodiment, when the valve is closed.
Figure 20:
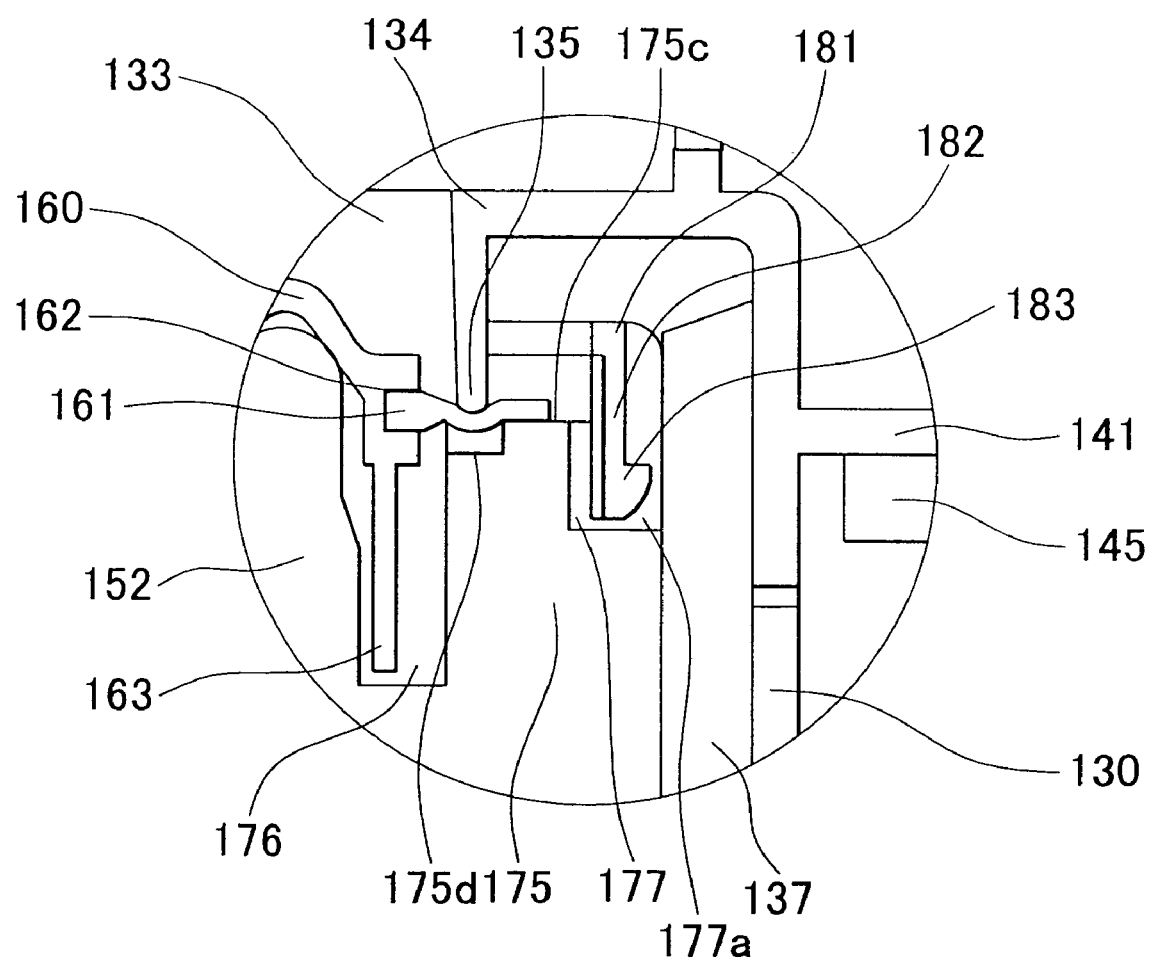
FIG. 20 illustrates the enlarged cross-sectional view of a portion near the valve in FIG. 19.

FIGS. 19 and 20 illustrates another modified example of the float valve 120 in FIG. 11. In the structure shown in FIG. 11, most of the bottom portion of the valve 161 contacts the lower portion 175c formed on the top surface of the wall body 175. Accordingly, when the valve 161 is closed by contacting the valve seat 135, only the contact portion of the valve 161 deforms downward (the valve 161 does not deform with both ends turned up). When sealing is provided in this manner, sufficient sealing performance cannot be offered.

The structure in the modified example is employed to avoid such a problem. In this modified example, an annular groove 175d, which has a diameter slightly larger than the outer diameter of the cylindrical body 134, is formed on the inner side of the lower portion 175c of the wall body 175, and a step portion is formed at the boundary between the annular groove 175d and the lower portion 175c. FIG. 20 illustrates the enlarged view of the portion near the valve 161 in the modified example, when the valve 161 is closed. As shown in FIG. 20, because the annular groove 175*d*, which also is a step portion that does not contact the bottom portion of the valve 161, is formed on the inner side of the lower portion 175*c*, sealing is provided while the contact portion of the valve 161, which contacts the valve seat 135, deforms with the both ends turned up, when the valve 161 is closed. With this arrangement, the valve 161 is pressed to the valve seat 135 with a strong pressing force. As a result, high sealing performance can be offered.

The invention is not limited to the structures in the embodiment described above. The invention may be realized in various embodiments within the scope of the invention.

Next, a second embodiment of the invention will be described with reference to FIGS. 21 to 28.

Figure 21:
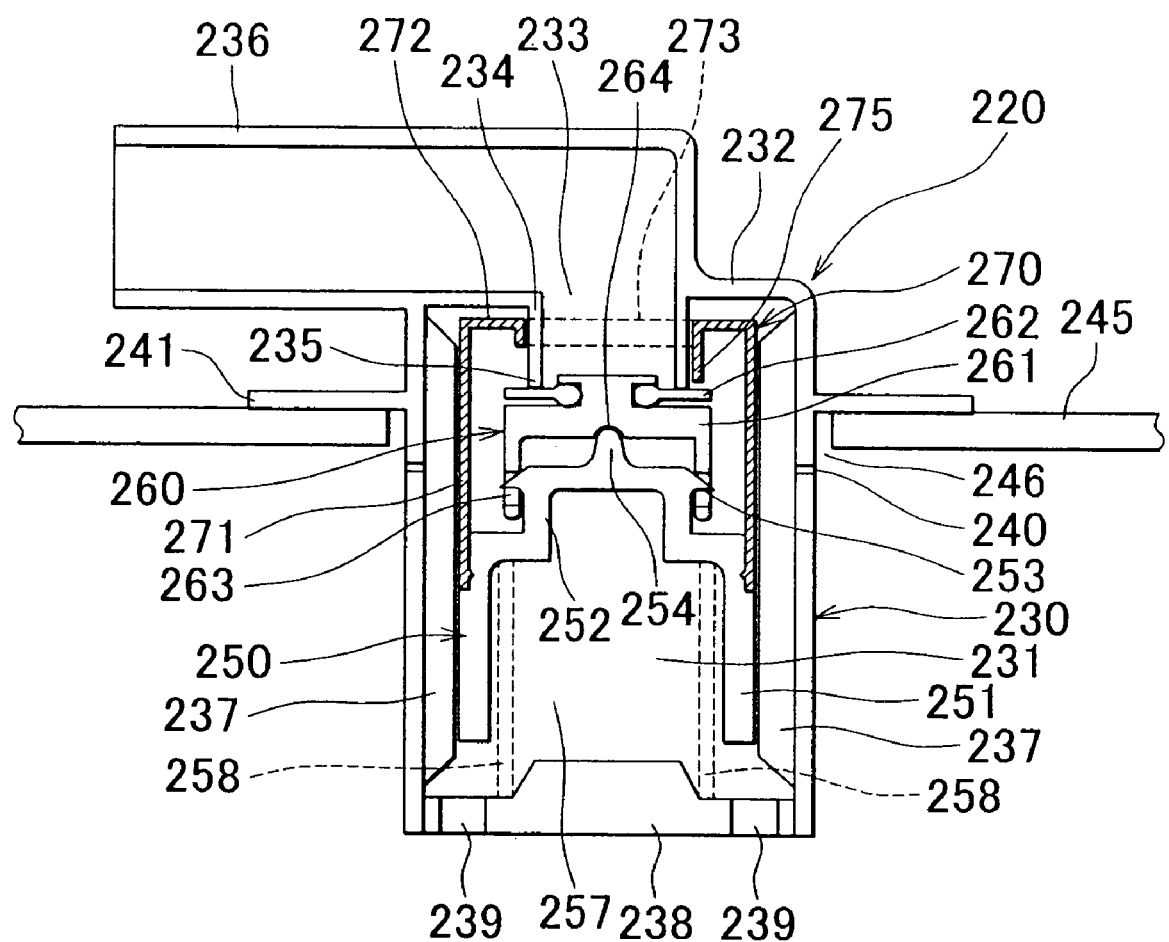
FIG. 21 illustrates the cross-sectional view of the entirety of a float valve according to a second embodiment of the invention, when a valve is closed.
Figure 22:
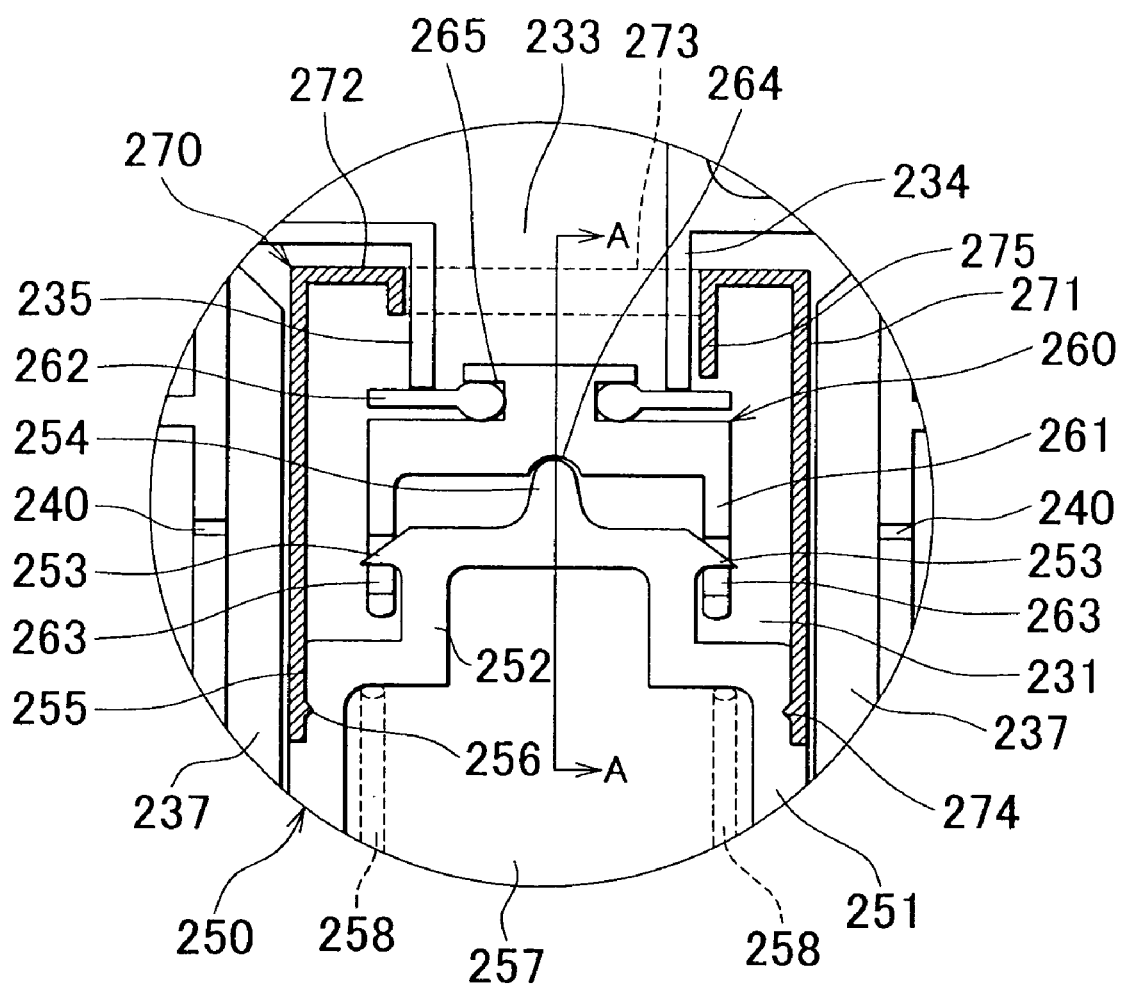
FIG. 22 illustrates the enlarged cross-sectional view of a portion near the valve in FIG. 21.
Figure 23:
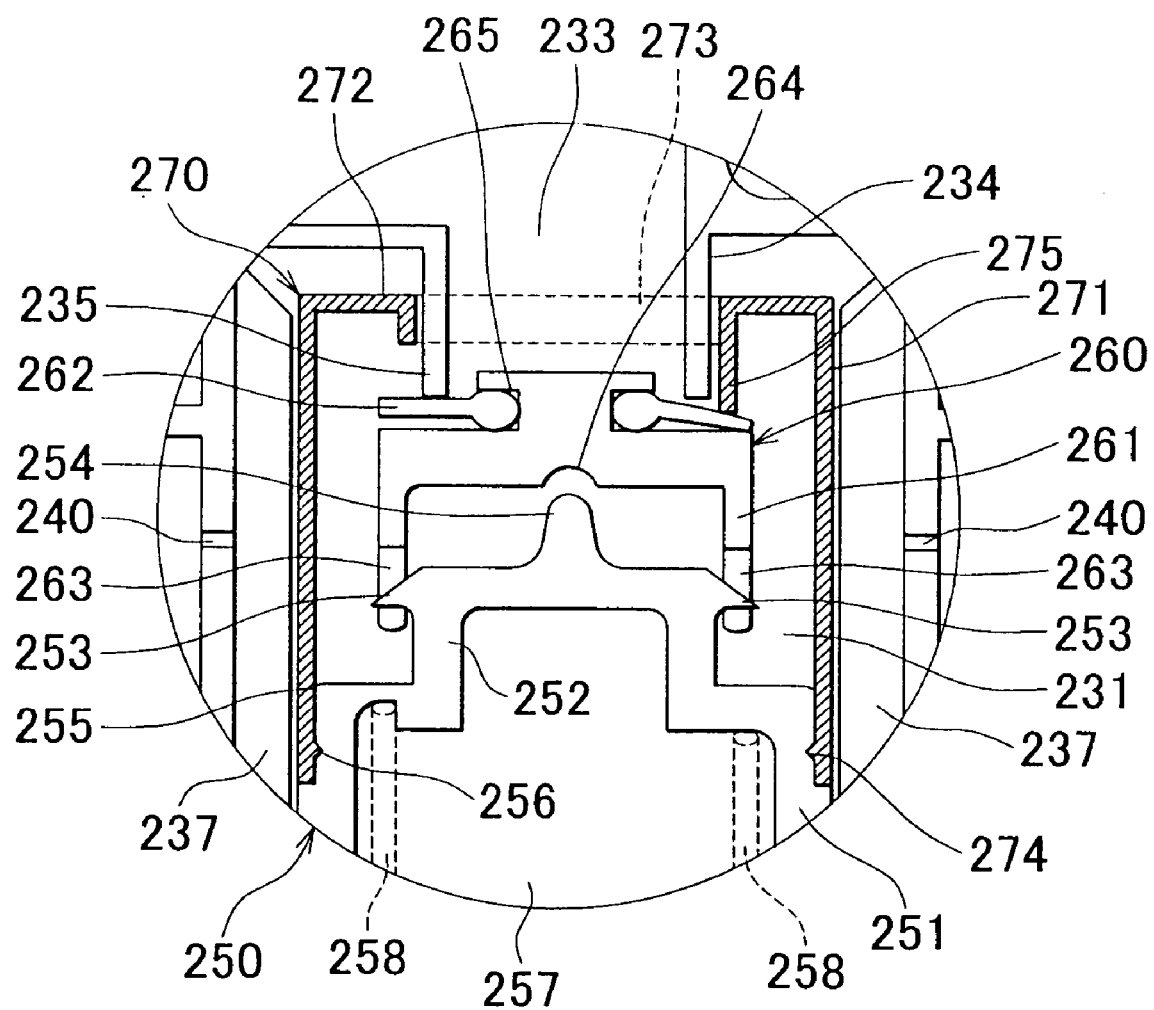
FIG. 23 illustrates the enlarged cross-sectional view showing the state where a part of the valve according to the second embodiment is opened forcibly by a pressing portion of a valve opening member.
Figure 24:
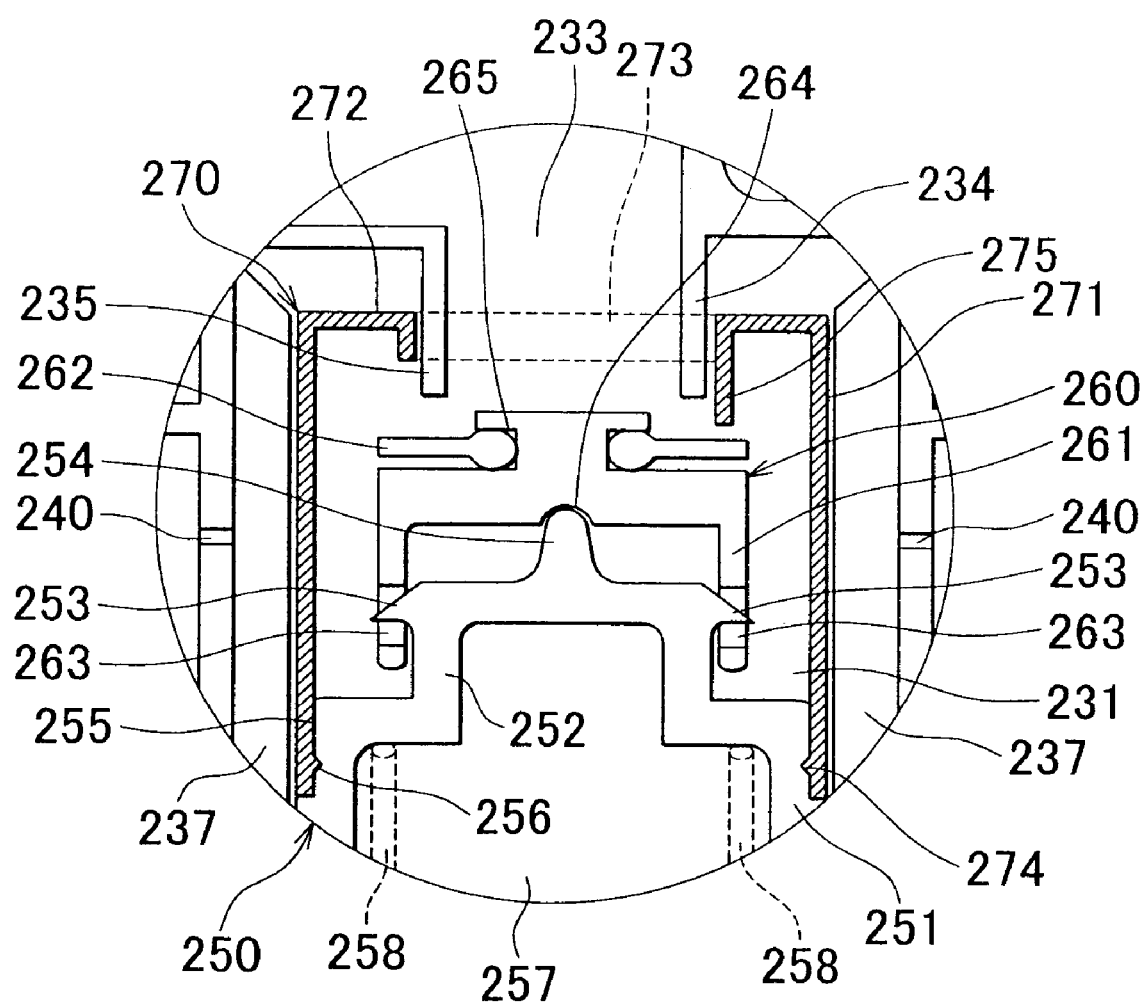
FIG. 24 illustrates the enlarged cross-sectional view showing the state where the valve according to the second embodiment is fully opened.
Figure 25:
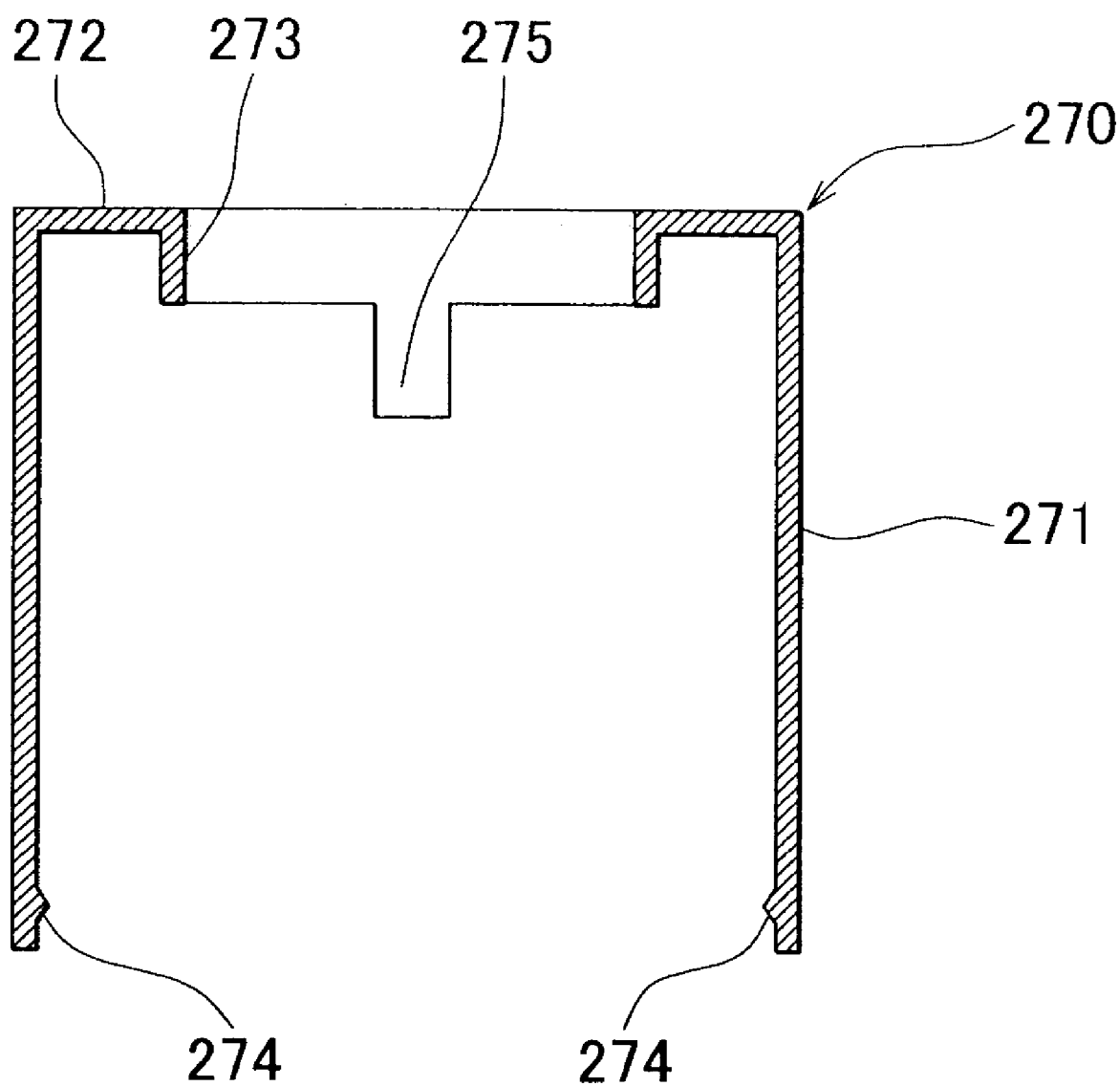
FIG. 25 illustrates the cross-sectional view, taken along line A-A in FIG. 22, of the valve opening member according to the second embodiment.

FIG. 21 illustrates the cross sectional view of the entirety of a float valve, when the valve is closed. FIG. 22 illustrates the enlarged cross-sectional view showing the portion near a valve support member in FIG. 21. FIG. 23 illustrates the enlarged cross-sectional view showing the state where a part of the valve is forcibly opened by a pressing portion of the valve opening member. FIG. 24 illustrates the state where the valve is fully opened. FIG. 25 illustrates the enlarged cross-sectional view of the valve opening member. The use of the float valve according to the second embodiment of the invention is not particularly limited. In the description below, however, the float valve according to the second embodiment is used for a fuel system for a motor vehicle.

The float valve 220 includes the case 230, the float 250 arranged in the case 230, the valve support member 260, the flange 241 that fixes the case 230 to the fuel tank 245, and the like.

The case 230 is a cylindrical resin member that is open at the bottom. The internal space 231 is formed in the case 230. The cylindrical body 234, which is communicated with the internal space 231 and which has the upper opening 233 at the center, is formed integrally on the top wall surface 232 of the case 230 at the center of the top wall surface 232. The valve seat 235 that contacts the valve support member 260 is formed at the lower-end portion of the cylindrical body 234.

The communication passage 236 is connected to the upper opening 233. The communication passage 236 is communicated with the canister (not shown). Through the communication passage 236, the fuel evaporative gas is discharged to the canister, and the atmosphere is introduced into the fuel tank 245.

The multiple ribs 237 are formed, in the vertical direction, along the inner wall surface of the case 230 with predetermined intervals. The ribs 237 are used to maintain a given space between the inner wall surface of the case 230 and a side wall surface of the float 250. Thus, the multiple passages through which, for example, fuel evaporative gas flows are formed. The end portions of the ribs 237 guide the float 250 on its vertical movement.

The bottom plate 238 is fitted to the bottom portion of the case 230 by, for example, thermal welding. The multiple bottom openings 239, through which, for example, fuel can flow into the internal space 231, are formed in the bottom plate 238. The bottom openings 239 are formed to permit the fuel to flow into the internal space 231, for example, when refueling is performed or when the motor vehicle is tilted or overturned. With this structure, the float 250 moves upward using the fuel flowing into the internal space 231 at the time of, for example, refueling, and the upper opening 233 is blocked by the valve support member 260 provided above the float 250, whereby the fuel is prevented from being discharged to the canister.

Also, the multiple communication holes 240 are formed in the upper portion of the side wall surface of the case 230. The fuel evaporative gas in the fuel tank 245 flows into the internal space 231 through the communication holes 240, and is discharged to the canister (not shown) through the upper opening 233 and the communication pipe 236. Also, the flange 241 is formed integrally with the side wall surface of the case 230 at the upper portion.

The reference numeral 245 denotes the fuel tank. The fitting hole 246 is formed in the top wall surface of the fuel tank 245. The case 230 is inserted into the fitting hole 246, and the flange 241 of the case 230 is fitted to the top wall surface of the fuel tank 245. As a result, the float valve 220 is arranged in the fuel tank 245, as shown in FIG. 21.

The float 250 arranged in the case 230 is made of resin. The float 250 is hollow, has a substantially cylindrical shape, and is open at the bottom. A large-diameter cylindrical portion 251 is formed at the lower portion of the float 250, and a small-diameter cylindrical portion 252 is formed at the upper portion of the float 250. The diameter of the large-diameter cylindrical portion 251 is constant in the axial direction. The large-diameter cylindrical portion 251 moves vertically along the ribs 237 formed along the inner wall surface of the case 230. A small-diameter portion 255 is formed on the upper-end portion of the large-diameter cylindrical portion 251. The diameter of the small-diameter portion 255 is slightly smaller than the diameter of the large-diameter cylindrical portion 251. A dent 256, to which a fitting projection 274 of the valve opening member 270 is fitted, is formed in the small-diameter portion 255.

Multiple latch pieces 253 extending outward in the radial direction are formed on the outer side surface of the small-diameter cylindrical portion 252. A rod-like body 254, which has a column shape and has an arc-shaped end portion, is provided at the center portion of the top surface of the small-diameter cylindrical portion 252.

The valve support member 260 including a valve guard 261 and a valve 262 is arranged above the small-diameter cylindrical portion 252 of the float 250. The valve guard 261 is made of resin. The valve guard 261 is hollow, has a substantially cylindrical shape, and is open at the bottom. Multiple fitting grooves 263 are formed in the side wall surface of the valve guard 261. The multiple latch pieces 253 formed on the outer side surface of the small-diameter cylindrical portion 252 of the float 250 can be fitted in the respective fitting grooves 263.

A concave bottom portion 264 is formed at the center of the bottom surface of the valve guard 261. The rod-like body 254, which has a small diameter and which is provided on the float 250, is fitted in the concave bottom portion 264. The rod-like body 254 on the float 250 is fitted in the concave bottom portion 264, whereby the valve 260 is supported on the float 250 in a pivot manner.

A groove portion 265, which is an annular concave portion, is formed in the upper portion of the outer side surface of the valve guard 261. An annular and rubber valve 262 is fitted in the groove portion 265. The valve 262 contacts the valve seat 235 that is formed at the lower-end portion of the cylindrical body 234 of the case 230, when the float 250 moves upward, whereby, for example, fuel is prevented from flowing toward the upper opening 233. In this case, the valve 262 is fitted in the groove portion 265 with a predetermined margin maintained in the longitudinal direction and the lateral direction. Accordingly, even if the float 250 is tilted, the valve 262 appropriately contacts the valve seat 235. The material of the valve 262 is not particularly limited, as long as the valve 262 is elastic and can be deformed by a pressing portion 275.

The float 250 and the valve support member 260 are fitted to each other in the following manner. First, the valve 262 is fitted in the groove portion 265 of the valve guard 261, whereby the valve support member 260 is completed. Next, the valve support member 260 is placed above the upper portion of the float 250, and a force is applied to the valve support member 260 from the above, whereby the valve support member 260 is moved downward. Then, the valve support member 260 is pressed down along the outer side surface of the small-diameter cylindrical portion 252 of the float 250. Finally, the latch pieces 253 provided on the outer side surface of the small-diameter cylindrical portion 252 enter the respective fitting grooves 263, whereby the float 250 and the valve support member 260 are fitted to each other. As a result, the valve support member 260 is connected to the float 250 so as to be vertically movable without being disconnected from the float 250.

The reference numeral 270 is a valve opening member made of resin. The valve opening member 270 includes a cylindrical skirt portion 271, a horizontal top wall surface 272, and a cylindrical body 273 that extends downward from the center portion of the top wall surface 272. The cylindrical skirt portion 271, the horizontal top wall surface 272 and the cylindrical body 273 are formed integrally with each other.

The outer diameter of the cylindrical skirt portion 271 is substantially equal to the outer diameter of the large-diameter cylindrical portion 251 of the float 250. The fitting projection 274 is formed on the lower portion of the inner surface of the skirt portion 271. The fitting projection 274 is fitted in the dent 256 formed in the upper portion of the outer side surface of the large-diameter cylindrical portion 251, whereby the valve opening member 270 is fitted to the float 250.

The cylindrical body 273 that extends downward from the center portion of the top wall surface 272 is arranged so as to surround the cylindrical body 234 that defines the upper opening 233. When the float 250 moves vertically, the cylindrical body 273 moves vertically along the outer side surface of the cylindrical body 234. Accordingly, oscillation of the upper-end portion of the valve opening member 270, which is likely to occur when the float 250 moves vertically, can be suppressed, and the float 250 smoothly moves vertically.

As shown in FIG. 25 that illustrates the cross-sectional view taken along line A-A in FIG. 22, a pressing portion 275 that extends downward is formed at a part of the lower-end surface of the cylindrical body 273. As shown in FIG. 25, the pressing portion 275 has a rectangular vertical cross section, and an arc-shaped horizontal cross section. As shown in FIGS. 21 and 22, the pressing portion 275 is positioned slightly above the valve 262, when the valve 262 is closed.

When the fuel level is slightly lowered in the internal space 231 of the case 230, the float 250 moves downward due to its own weight. Accordingly, the pressing portion 275 contacts a part of the valve 262, and presses the contact portion of the valve 262 downward as shown in FIG. 23. The contact portion of the valve 262 is forcibly opened, whereby communication is provided between the upper opening 233 and the internal space 231. Therefore, the valve 262 is fully opened as shown in FIG. 24.

Figure 26:
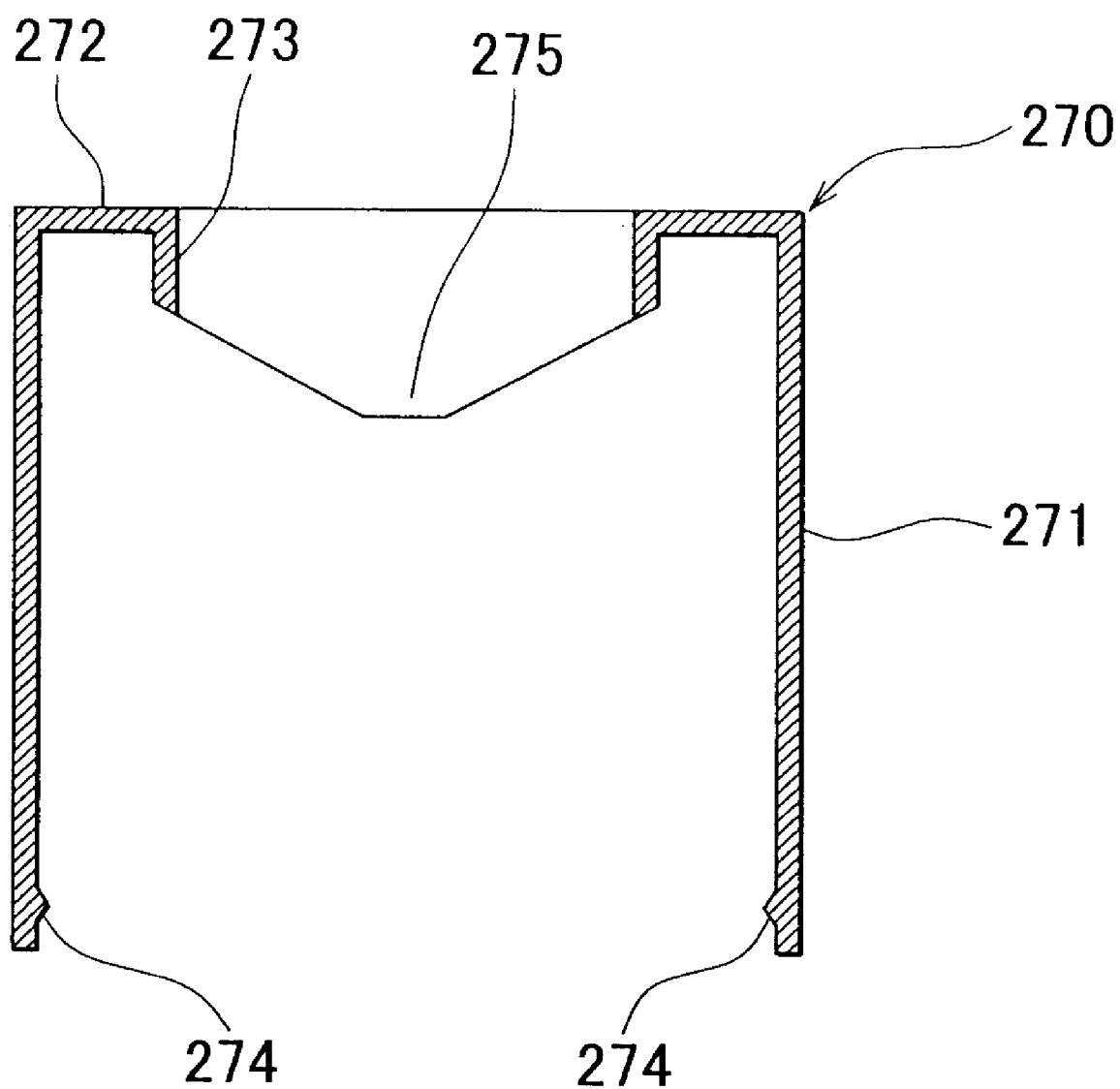
FIG. 26 illustrates the cross-sectional view of another valve opening member according to the second embodiment.

FIG. 26 illustrates the pressing portion 275 according to a modified example. In the structure shown in FIG. 26, the lower-end portion of the cylindrical body 273 is formed as a bevel portion. The portion, which is the longest in the downward direction in the cylindrical body 273, is used as the pressing portion 275. With this structure, because the root portion of the pressing portion 275 can be wide, the strength of the pressing portion 275 can be increased.

In the above description, the skirt portion 271 is a cylindrical member. However, the skirt portion 271 may be formed of multiple legs that extend downward and that are provided at predetermined intervals, as long as the skirt portion 271 is sufficiently strong.

Next, assembly of the float valve 220 will be described. First, the valve 262 is fitted in the groove portion 265 of the valve guard 261. Next, the latch pieces 253 of the small-diameter cylindrical portion 252 are pressed into the respective fitting grooves 263 of the valve support member 260, whereby the float 250 and the valve support member 260 are fitted to each other. Then, the valve opening member 270 is fitted to the float 250, whereby the float unit is completed.

Next, the case 230 is turned upside-down, and the float unit assembled in the above-mentioned manner is turned upside-down and then inserted in the case 230. In this case, the cylindrical body 234 arranged at the upper portion of the case 230 is fitted in the cylindrical body 273 of the valve opening member 270. Then, a coil spring 258 is fitted in a bottom space 257 of the float 250.

Next, the bottom plate 238 is fixed to the bottom portion of the case 230 by an adhesive agent, welding, or the like, whereby the case 230 is closed. At this time, one end portion of the spring 258 contacts the top surface of the bottom plate 238. After being assembled, the float valve 220 is inserted into the fuel tank 245 while standing upright, and the flange 241 is fixed on the top wall surface of the fuel tank 245.

Next, effects of the invention will be described. Usually, the fuel evaporative gas generated in the fuel tank 245 flows into the internal space 231 through the bottom openings 239 and the communication holes 240, and is then discharged to the canister through the upper opening 233 and the communication passage 236. Even if the fuel tank 245 oscillates and the fuel blocks the bottom openings 239, the fuel evaporative gas is discharged smoothly because the communication holes 240 are formed in the upper portion of the case 230.

If the fuel flows into the internal space 231 through the bottom openings 239 when refueling is performed or when the vehicle moves vertically or turns, the fuel flows through the internal space 231 formed between the inner wall surface of the case 230 and the side wall surface of the float 250, and then flows toward the communication passage 236 through the upper opening 233.

However, the fuel flowing into the internal space 231 presses the float 250 upward. In addition, a buoyant force and an urging force of the spring 258 are applied to the float 250. Accordingly, the float 250 immediately moves upward along with the valve support member 260, and the valve 262 contacts the valve seat 235.

The force with which a valve contacts a valve seat increases in proportion to the diameter of the valve. The valve 262 in the second embodiment has a relatively large diameter, and the force with which the valve 262 contacts the valve seat 235 is great. Accordingly, even if the pressure in the fuel tank 245 is reduced by only a small amount, the valve 262 does not move away from the valve seat 235.

When the fuel tank is filled up with fuel, the pressure in the fuel tank 245 is high. The valve 262 receives this high pressure from below, and contacts the valve seat 235 with a strong force. Accordingly, even if the pressure in the fuel tank 245 is reduced by only a small amount, the valve 262 does not move away from the valve seat 235. However, the float 250 contacts the valve support member 260 at a small area at which the rod-like body 254 contacts the concave bottom portion 264. Accordingly, the rod-like body 254 moves away from the concave bottom portion 264 when the fuel level is lowered even by only a small amount in the fuel tank 245, and the float 250 moves downward due to its own weight.

Then, the pressing portion 275 of the valve opening member 270 formed integrally with the float 250 contacts a part of the valve 262, the contact portion of the valve 262 is pressed downward as shown in FIG. 23, and the contact portion of the valve 262 is forcibly opened, whereby communication is provided between the upper opening 233 and the internal space 231. Accordingly, the pressure in the fuel tank 245 is immediately reduced. As a result, the valve 262 is fully opened as shown in FIG. 24.

Figure 27:
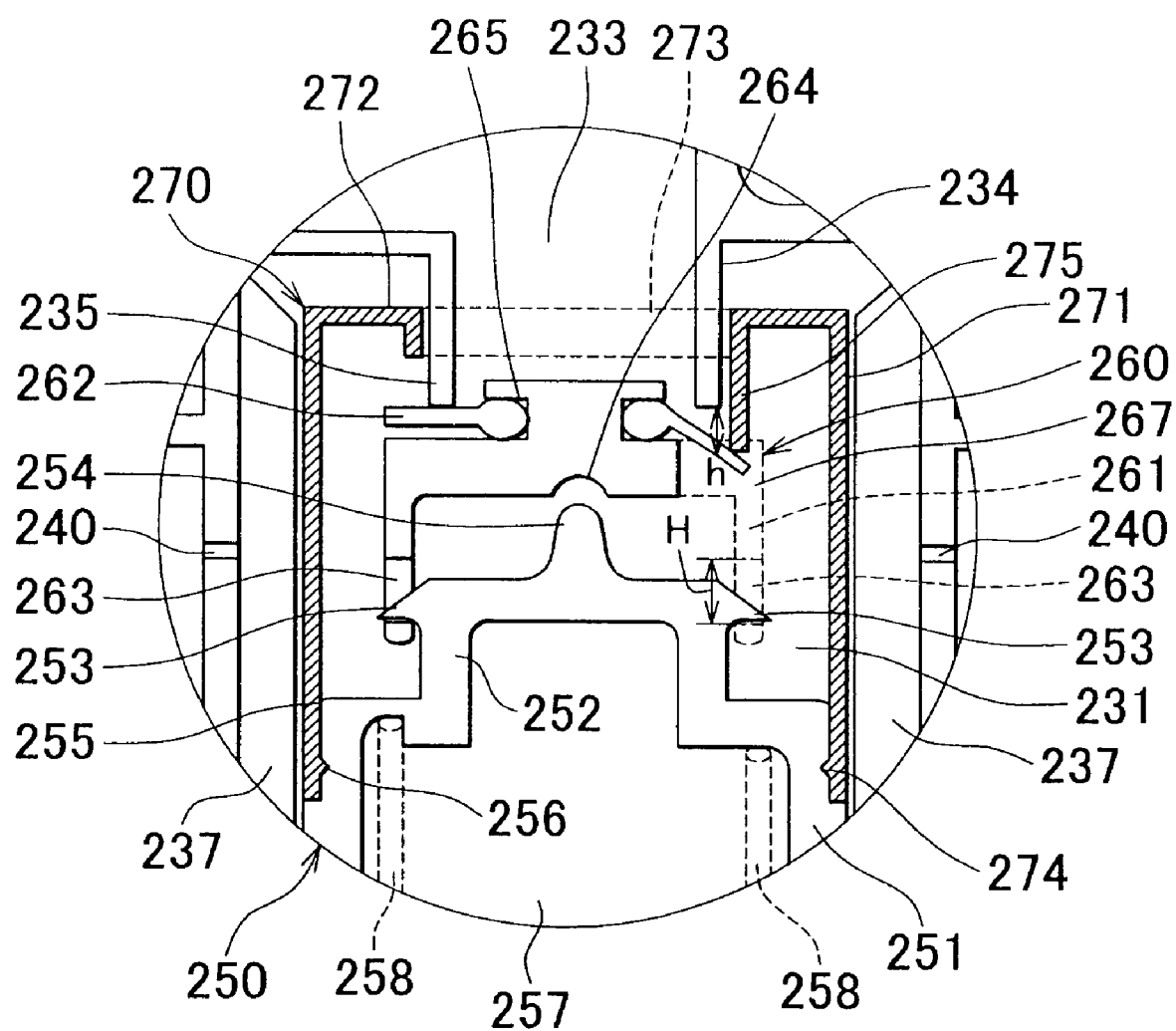
FIG. 27 illustrates the enlarged cross-sectional view of a float valve according to a modified example of the second embodiment, showing the state where a part of the valve is opened forcibly by the pressing portion of the valve opening member.
Figure 28:
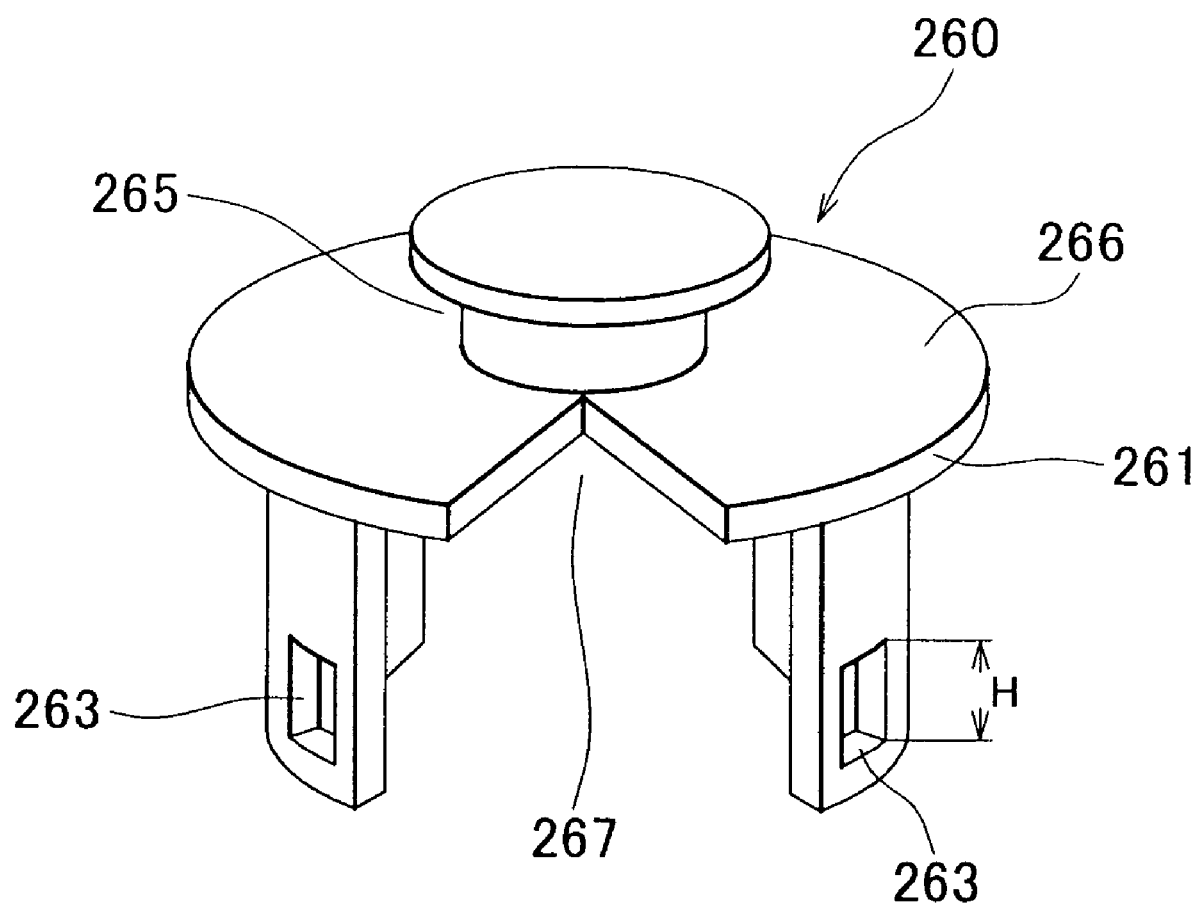
FIG. 28 illustrates the perspective view of the valve used in the modified example of the second embodiment.
Figure 29:
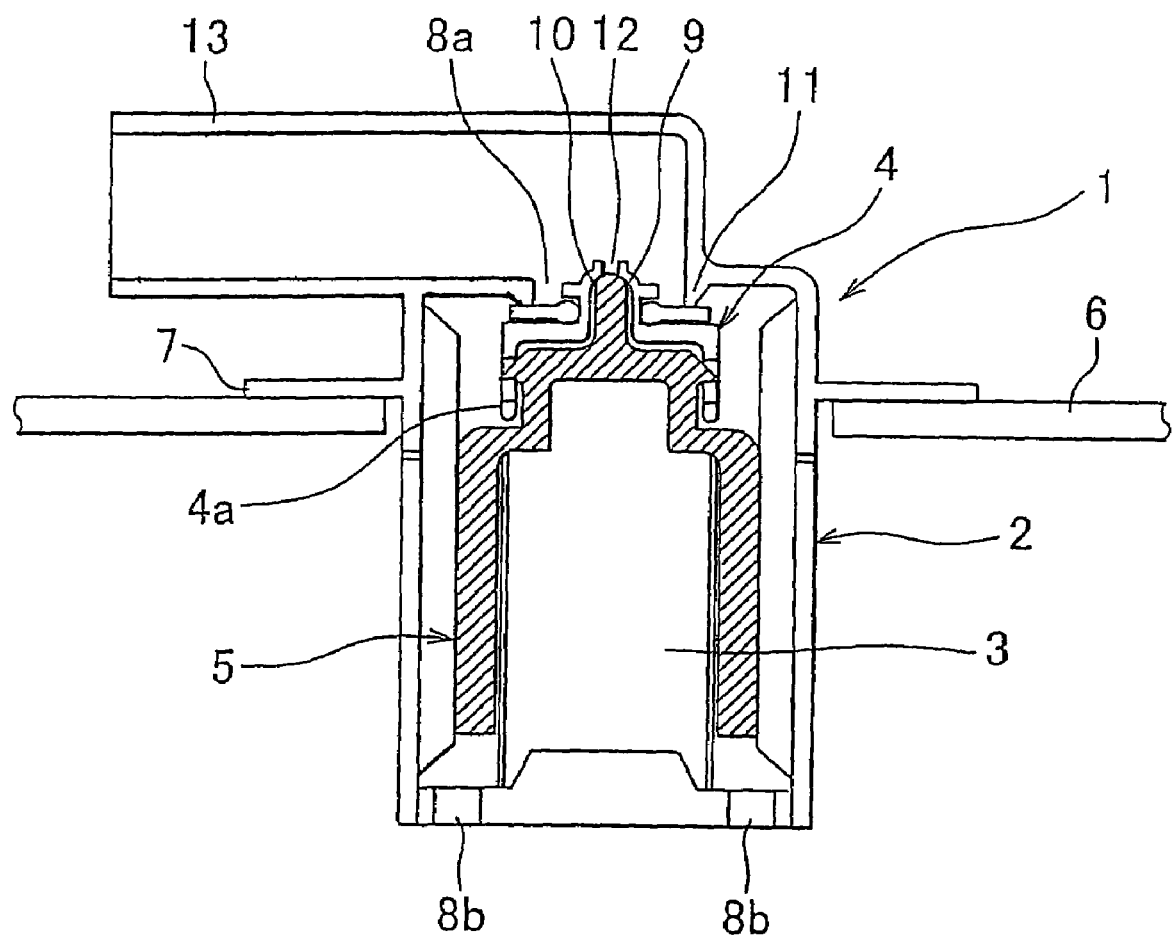
FIG. 29 illustrates the cross-sectional view of the entirety of a float valve according to art pertinent to the invention.

FIGS. 27 and 28 illustrates a modified example. In this modified example, a notch 267 is formed in a top wall surface 266 of the valve support member 260, at a position corresponding to the pressing portion 275, whereby the amount by which the rubber valve 262 fitted to the groove 265 of the top wall surface 266 is pressed down by the pressing portion 275 is increased.

In the example shown in FIGS. 21 to 24, the top wall surface 266 of the valve support member 260 is flat, and the annular rubber valve 262 is arranged on the top wall surface 266. Accordingly, when the pressed portion of the valve 262 is pressed downward by the pressing portion 275 of the valve opening member 270, the distance traveled by the pressed portion of the valve 262 corresponds to the distance between the original position of the pressed portion and the position at which the pressed portion of the valve 262 contacts the top wall surface 266 of the valve support member 260. Therefore, even when the length H of the fitting groove 263 is sufficient in the vertical direction, if the distance between the valve seat 235 and the valve 262 is shorter than length of the fitting groove 263 in the vertical direction, the valve 262 may not be opened sufficiently.

In this example, as shown in FIG. 28, the notch 267 is formed in the top wall surface 266 of the same valve support member 260 as that in FIGS. 21 to 24, at a position below the pressing portion 275 of the valve opening member 270. Also, the notch 267 is sufficiently large such that the pressing portion 275 can move downward through the notch 267.

The operation for opening the valve will be described. In the process of opening the valve 262, first, the valve opening member 270 is pressed downward along with the float 250. Then, the pressing portion 275 of the valve opening member 270 contacts the top surface of the valve 262, and then presses the valve 262 downward. Because the notch 267 is formed in the top wall surface 266 of the valve support member 260 at the position below the pressing portion 275, the pressing portion 275 can move downward by the distance equal to the length H of the fitting groove 263. As a result, as shown in FIG. 27, the distance "h" between the valve seat 235 and the valve 262 is longer than that shown in FIGS. 21 to 24, whereby the valve 262 can be opened sufficiently.

The invention is not limited to the configurations of the above-mentioned embodiments, and various modifications may be made to the design within the scope of the invention.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, including more, less, or only a single element, are also within the spirit and scope of the invention.

What is claimed is:

1. A float valve structure, comprising:
   a case;
   a valve seat that is formed at an end portion of the case, at a position near an upper opening of the case;
   a float that is arranged in a space formed in the case so as to be vertically movable;
   a valve support member that has a closed upper-end portion, is arranged above the float, and can be inserted into the upper opening;
   a valve that is fitted to the valve support member and that can contact the valve seat; and
   a valve opening member that is located substantially on an outer periphery of the float and located radially outside of a diameter of the valve seat such that the valve opening member can vertically move together with the float and opens at least one portion of the valve,
   wherein the float valve structure has a single seal structure.

2. The float valve structure according to claim 1, further comprising:
   a stopper member that prevents the valve support member from entering the upper opening by a predetermined amount.

3. The float valve structure according to claim 2, wherein the stopper member is arranged at the upper opening.

4. The float valve structure according to claim 2, wherein the stopper member is formed at the upper portion of the valve support member, and prevents the valve support member from entering the upper opening more than a predetermined value.

5. The float valve structure according to claim 1, wherein the valve opening member has a pressing portion that extends vertically downward and that presses the at least one portion of the valve from above.

6. The float valve structure according to claim 5, wherein a projection portion is formed on a outermost periphery of the valve, and the pressing portion of the valve opening member is arranged on an inner side of the projection portion of the valve.

7. The float valve structure according to claim 6, wherein the pressing portion of the valve opening member is arranged such that the projection portion of the valve is surrounded on three sides by the pressing portion and two side wall portions.

8. The float valve structure according to claim 5, wherein the valve seat is formed at a lower end of a cylindrical body, the valve opening member has a cylindrical portion that surrounds the cylindrical body, and the pressing portion is formed at the cylindrical portion.

9. The float valve structure according to claim 1, wherein the valve opening member is formed separately from the float.

10. The float valve structure according to claim 1, wherein the float valve is used for a fuel system of a motor vehicle.

11. A float valve structure, comprising:
    a case;
    a valve seat that is formed at an end portion of the case, at a position near an upper opening of the case;
    a float that is arranged in a space formed in the case so as to be vertically movable;
    a valve support member that has a closed upper-end portion and is arranged above the float;
    a valve that is fitted to the valve support member and that can contact the valve seat;
    a valve opening member that is located substantially on an outer periphery of the float and located radially outside of a diameter of the valve seat such that the valve opening member can vertically move together with the float and opens at least one portion of the valve; and a wall body that is arranged on a top surface of the float at least at a position below the valve opening member, wherein the float valve structure has a single seal structure.

12. The float valve structure according to claim 11, wherein an annular groove is formed in a top surface of the wall body such that the valve can be curved downward by the valve seat when the valve is closed.

13. The float valve structure according to claim 11, wherein the valve opening member has a pressing portion that extends vertically downward and that presses at least the one portion of the valve from above when the valve is closed.

14. The float valve structure according to claim 13, wherein a projection portion is formed on a outermost periphery of the valve, and the pressing portion of the valve opening member is arranged on an inner side of the projection portion of the valve.

15. The float valve structure according to claim 14, wherein the pressing portion of the valve opening member is arranged such that the projection portion of the valve is surrounded on three sides by the pressing portion and two side wall portions.

16. The float valve structure according to claim 13, wherein the valve seat is formed at a lower end of a cylindrical body, the valve opening member has a cylindrical portion that surrounds the cylindrical body, and the pressing portion is formed at the cylindrical portion.

17. The float valve structure according to claim 11, wherein the valve opening member is formed separately from the float.

18. The float valve structure according to claim 11, wherein the float valve is used for a fuel system of a motor vehicle.

\* \* \* \* \*